United States Patent
Hartman et al.

(10) Patent No.: US 9,483,072 B2
(45) Date of Patent: *Nov. 1, 2016

(54) MODULAR CAM SYSTEM

(71) Applicant: Dell Products L.P., Round Rock, TX (US)

(72) Inventors: Corey D. Hartman, Hutto, TX (US); Alejandro Z. Rodriguez, Round Rock, TX (US); Russell Smith, Taylor, TX (US)

(73) Assignee: Dell Products L.P., Round Rock, TX (US)

( * ) Notice: Subject to any disclaimer, the term of this patent is extended or adjusted under 35 U.S.C. 154(b) by 57 days.

This patent is subject to a terminal disclaimer.

(21) Appl. No.: 14/267,701

(22) Filed: May 1, 2014

(65) Prior Publication Data

US 2014/0240924 A1 Aug. 28, 2014

Related U.S. Application Data

(63) Continuation of application No. 13/344,386, filed on Jan. 5, 2012, now Pat. No. 8,743,562.

(51) Int. Cl.
*G06F 1/16* (2006.01)
*H01R 13/629* (2006.01)
*F16H 25/08* (2006.01)

(52) U.S. Cl.
CPC ............ *G06F 1/16* (2013.01); *F16H 25/08* (2013.01); *H01R 13/62905* (2013.01); *Y10T 29/49826* (2015.01); *Y10T 74/2101* (2015.01)

(58) Field of Classification Search
CPC ........................................................ G06F 1/16
See application file for complete search history.

(56) References Cited

U.S. PATENT DOCUMENTS

| | | | |
|---|---|---|---|
| 6,366,470 B1 * | 4/2002 | Goessel | G06F 1/184 24/548 |
| 6,381,148 B1 * | 4/2002 | Daskalakis | H05K 7/1431 211/41.17 |
| 6,671,181 B2 * | 12/2003 | Kaminski | G06F 1/184 361/752 |
| 7,012,813 B2 * | 3/2006 | Wang | G06F 1/184 361/753 |
| 7,023,703 B2 * | 4/2006 | Peloza | G02B 6/4201 361/727 |
| 7,123,487 B2 * | 10/2006 | Saito | G06K 13/0875 361/726 |
| 7,397,674 B2 * | 7/2008 | Schlack | H05K 7/1409 361/754 |
| 7,558,068 B2 * | 7/2009 | Barina | H01L 23/4093 165/80.3 |
| 8,270,181 B2 * | 9/2012 | Fukui | H05K 7/1408 361/740 |
| 8,305,769 B2 | 11/2012 | Schneider | |
| 8,391,022 B2 | 3/2013 | Olesiewicz et al. | |
| 2007/0030660 A1 * | 2/2007 | Peng | H05K 7/1408 361/801 |
| 2007/0258226 A1 * | 11/2007 | Ong | H05K 7/1429 361/801 |
| 2011/0026235 A1 * | 2/2011 | Searby | G06F 1/185 361/810 |
| 2012/0134128 A1 * | 5/2012 | Okamoto | H04M 1/0237 361/807 |

* cited by examiner

*Primary Examiner* — David M Sinclair
*Assistant Examiner* — Robert Brown
(74) *Attorney, Agent, or Firm* — Haynes and Boone, LLP

(57) ABSTRACT

A cam system includes a beam including a plurality of coupling features. A first handle is operable to be coupled to the beam using the coupling features. A plurality of cam elements are each operable to be coupled to the beam at different locations along the beam using the coupling features. A plurality of cam brackets are each operable to be mounted to a first member having a first connector. The coupled-together beam, first handle, and cam elements are operable to be coupled a second member having a second connector such that, with the cam brackets mounted to the first member, the engagement of the cam elements with the cam brackets mate the first connector and the second connector.

20 Claims, 28 Drawing Sheets

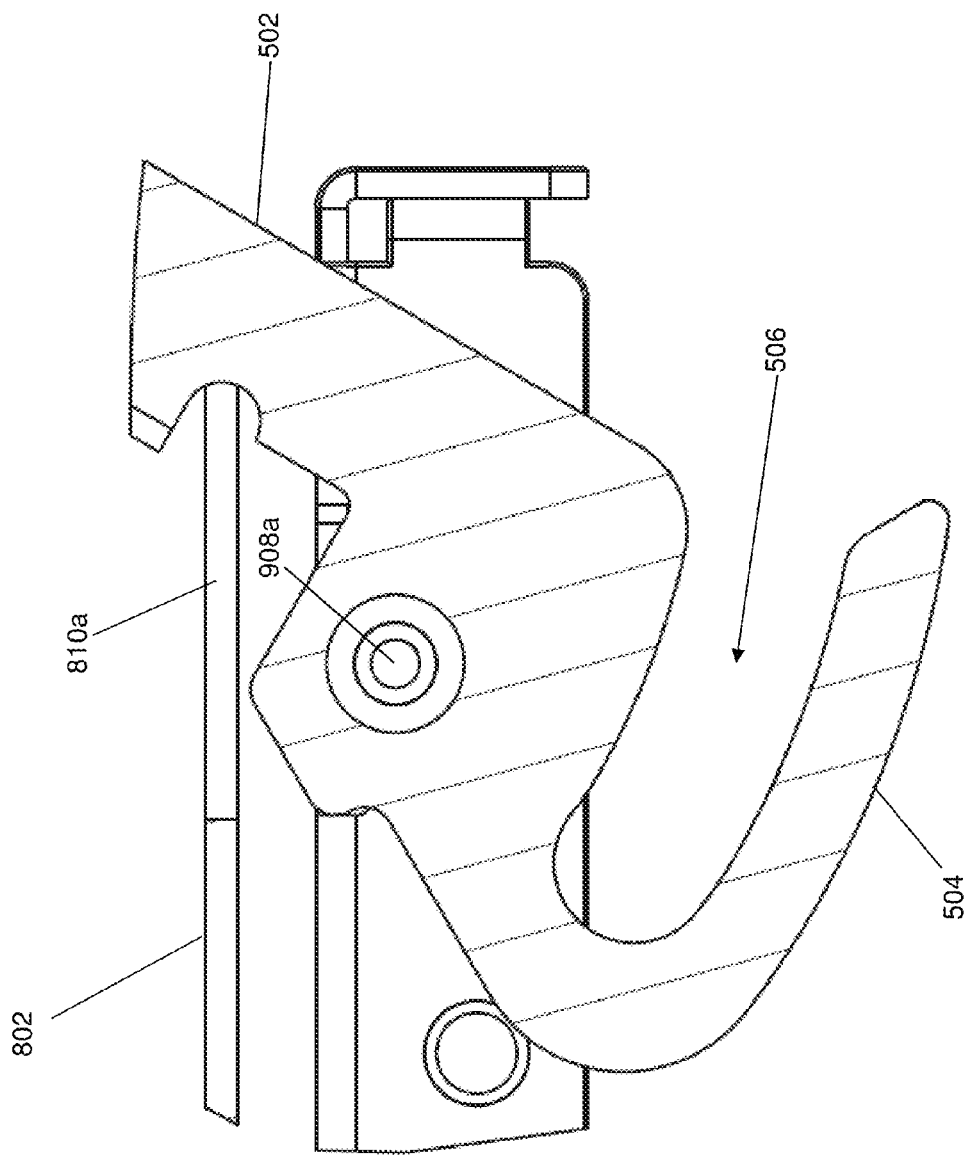

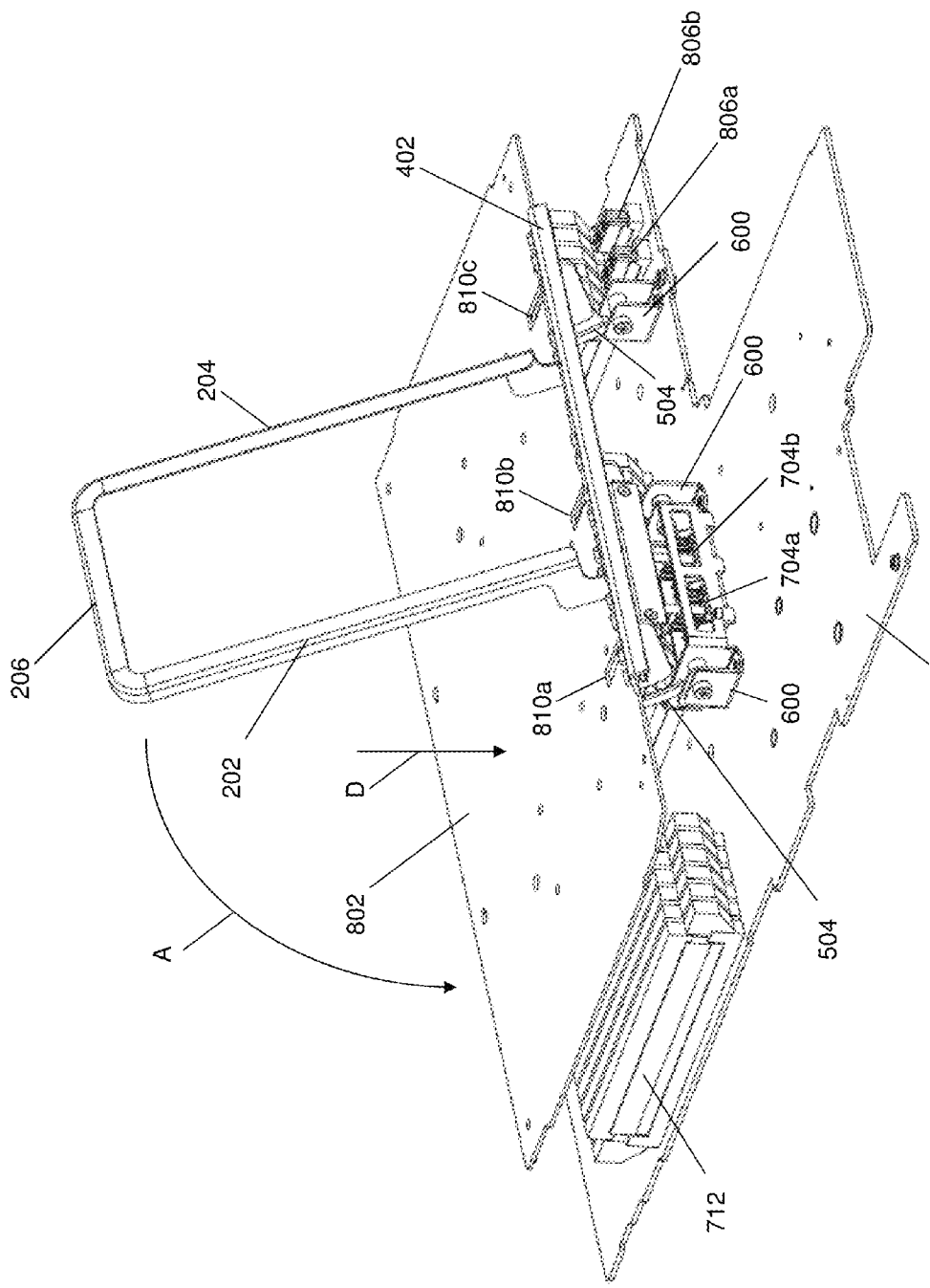

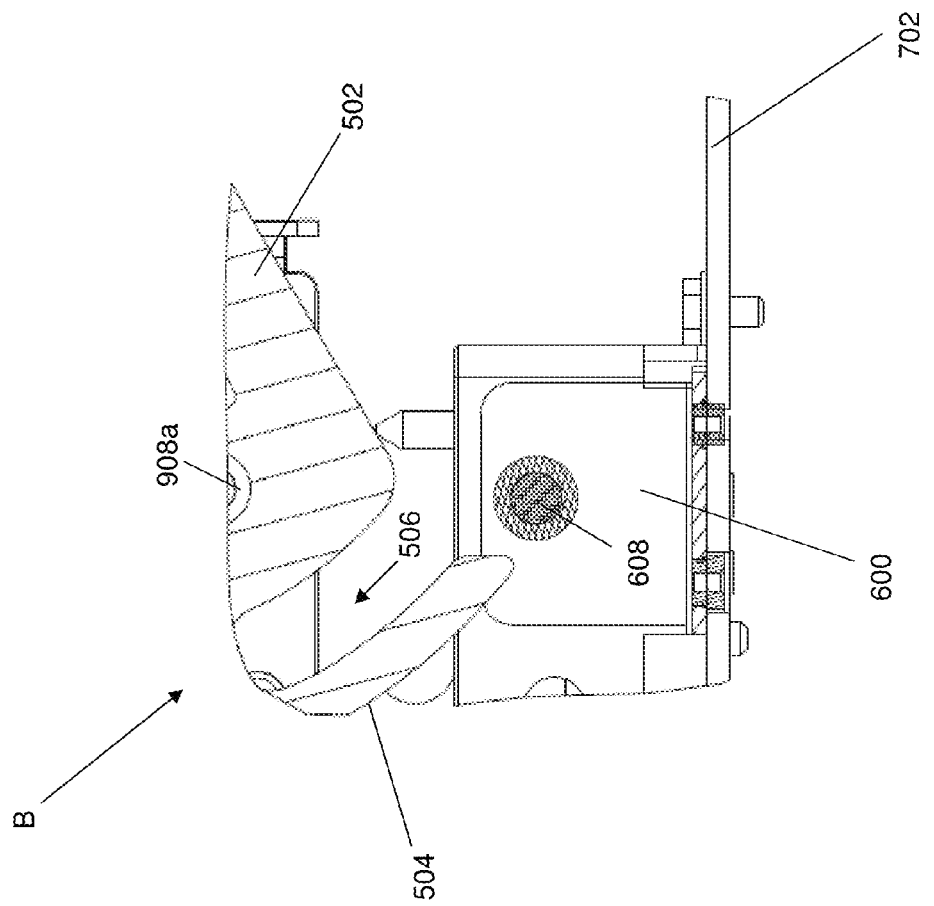

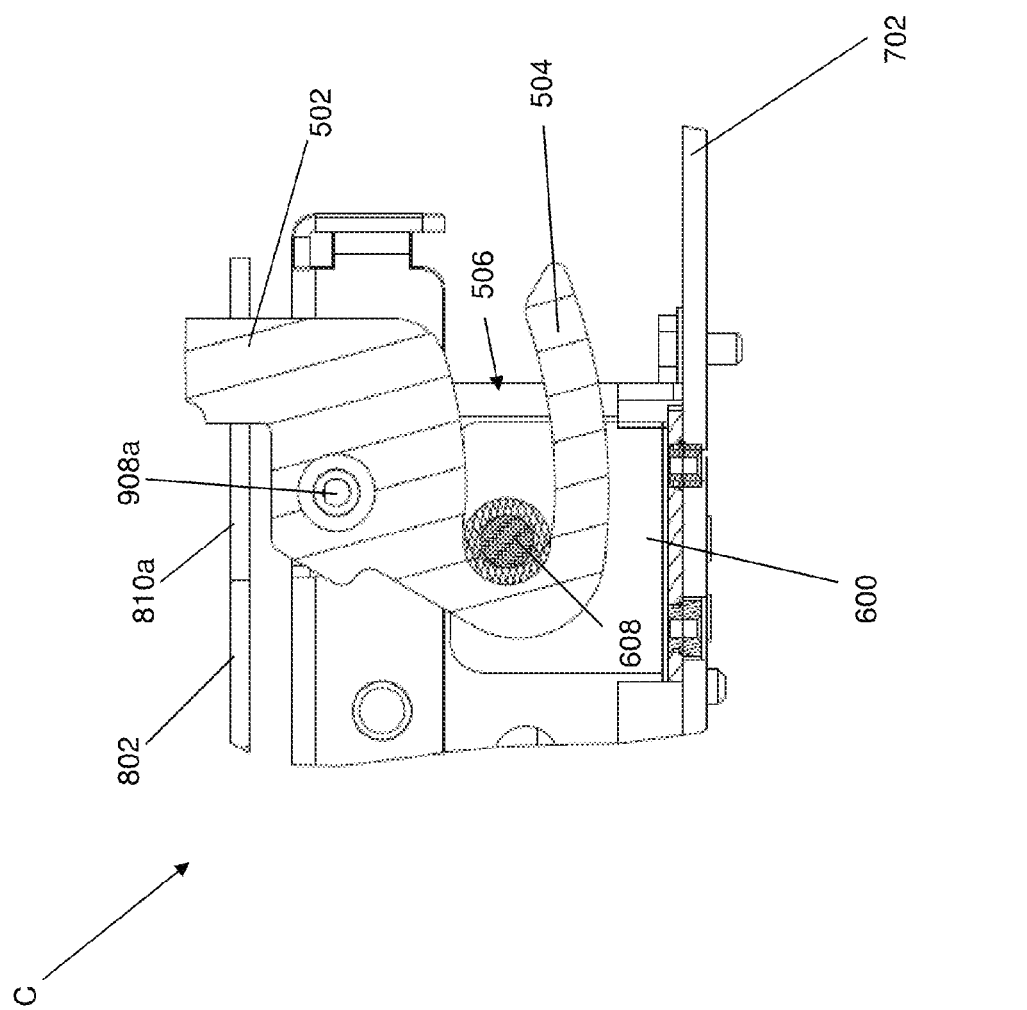

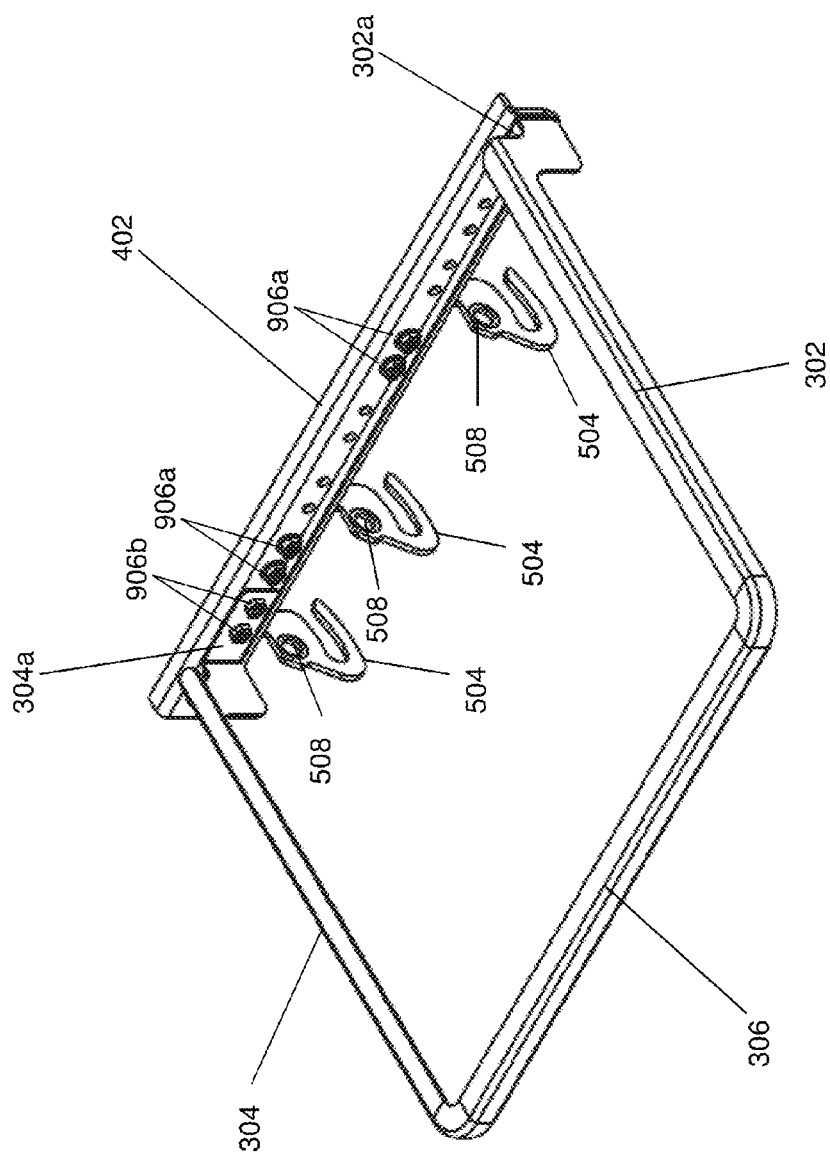

MODULAR CAM SYSTEM

CROSS REFERENCE TO RELATED APPLICATIONS

This application is a Continuation of U.S. patent application Ser. No. 13/344,386 filed Jan. 5, 2012, of which is incorporated herein by reference.

BACKGROUND

The present disclosure relates generally to information handling systems (IHSs), and more particularly to a modular cam system for an IHS.

As the value and use of information continues to increase, individuals and businesses seek additional ways to process and store information. One option is an IHS. An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs sometimes include connectors that must be mated by generating relatively high connector forces. For example, some IHS's include multiple boards with connectors that must be mated together by generating such high connector forces such that the boards are connected together for operation. Typically, such relatively high connector forces are generated using cam mechanisms. However, some IHSs may include configurable systems such as, for example, a first board having a connector that may either be mated with a connector on a second board in one system configuration or a connector on a third board in another system configuration. In such situations, the configurations of the first board, second board, and third board may prevent a single cam mechanism from being used across the different system configurations. Furthermore, other limitations may further restrict the use of a cam mechanism such as, for example, the board connectors being located central to the boards and away from the sidewalls of the IHS chassis such that the chassis structure is not available for supporting the cam mechanism, thermal requirements that prevent the cam mechanism from being positioned adjacent components on the boards, cabling requirements that restrict the positioning of cam mechanism, and/or a variety of other limitations known in the art.

Accordingly, it would be desirable to provide an improved cam system.

SUMMARY

According to one embodiment, a cam system includes a beam including a plurality of coupling features, a first handle that is operable to be coupled to the beam using the coupling features, a plurality of cam elements that are each operable to be coupled to the beam at different locations along the beam using the coupling features, and a plurality of cam brackets that are each operable to be mounted to a first member having a first connector, wherein the coupled-together beam, first handle, and cam elements are operable to be coupled a second member having a second connector such that, with the cam brackets mounted to the first member, the engagement of the cam elements with the cam brackets mate the first connector and the second connector.

BRIEF DESCRIPTION OF THE DRAWINGS

FIG. 6b is a bottom perspective view illustrating an embodiment of the cam bracket of FIG. 6a.

FIG. 9f is a side view illustrating an embodiment of one of the cam element of FIG. 5 coupling the cam system of FIGS. 9c and 9d to the second member of FIG. 8.

FIG. 9g is a perspective view illustrating an embodiment of the cam system and second member of FIG. 9e being coupled to the first member and cam brackets of FIG. 9b.

FIG. 9h is a side view illustrating an embodiment of one of the cam elements on the cam system and second member of FIG. 9e being coupled to the cam brackets on the first member of FIG. 9b.

FIG. 9i is a side view illustrating an embodiment of one of the cam elements on the cam system and second member of FIG. 9e coupled to the cam brackets on the first member of FIG. 9b.

FIG. 12b is a top perspective view illustrating an embodiment of the handle of FIG. 3 and the cam elements of FIG. 5 coupled to the beam of FIG. 4 to provide a cam system.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
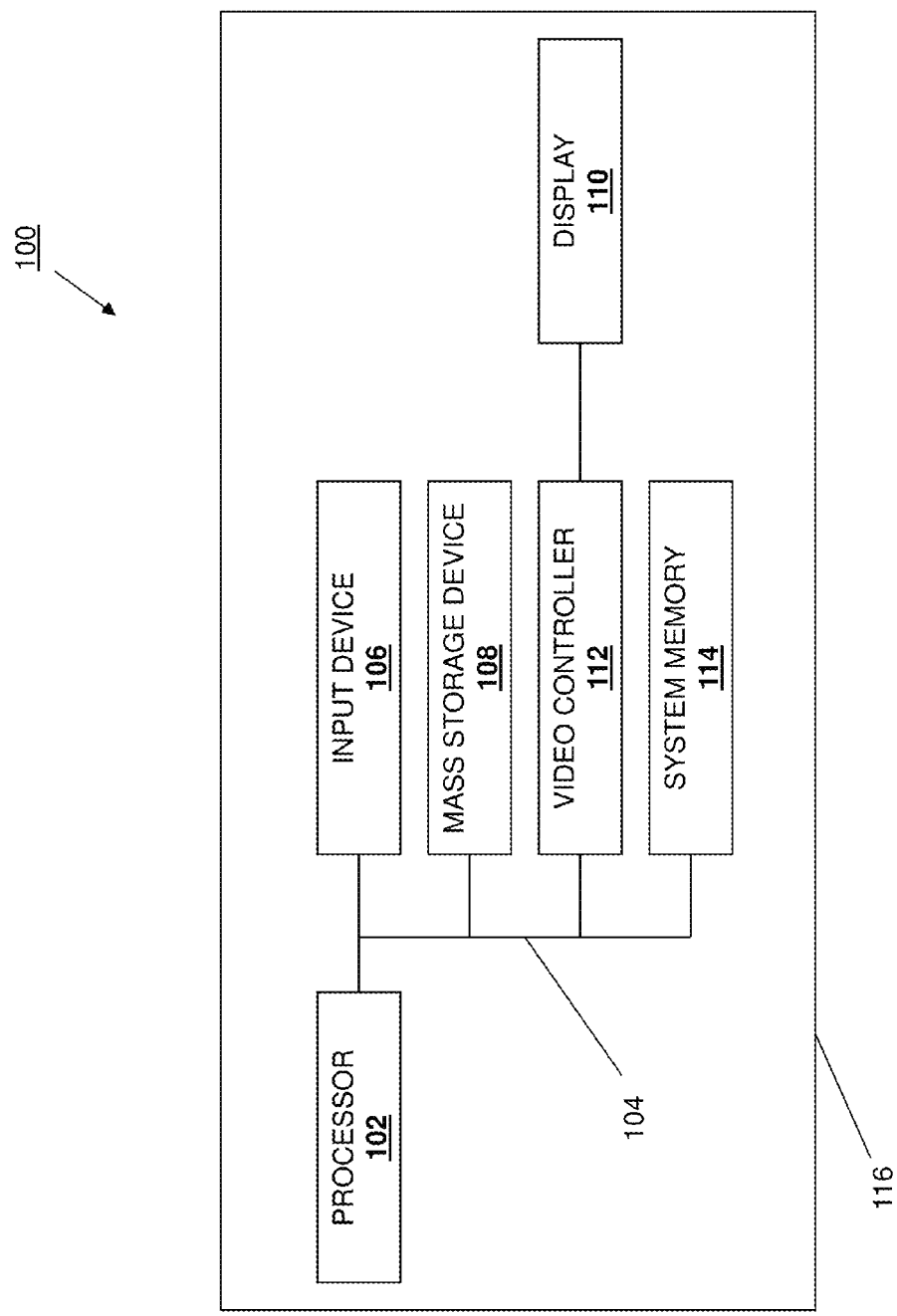
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
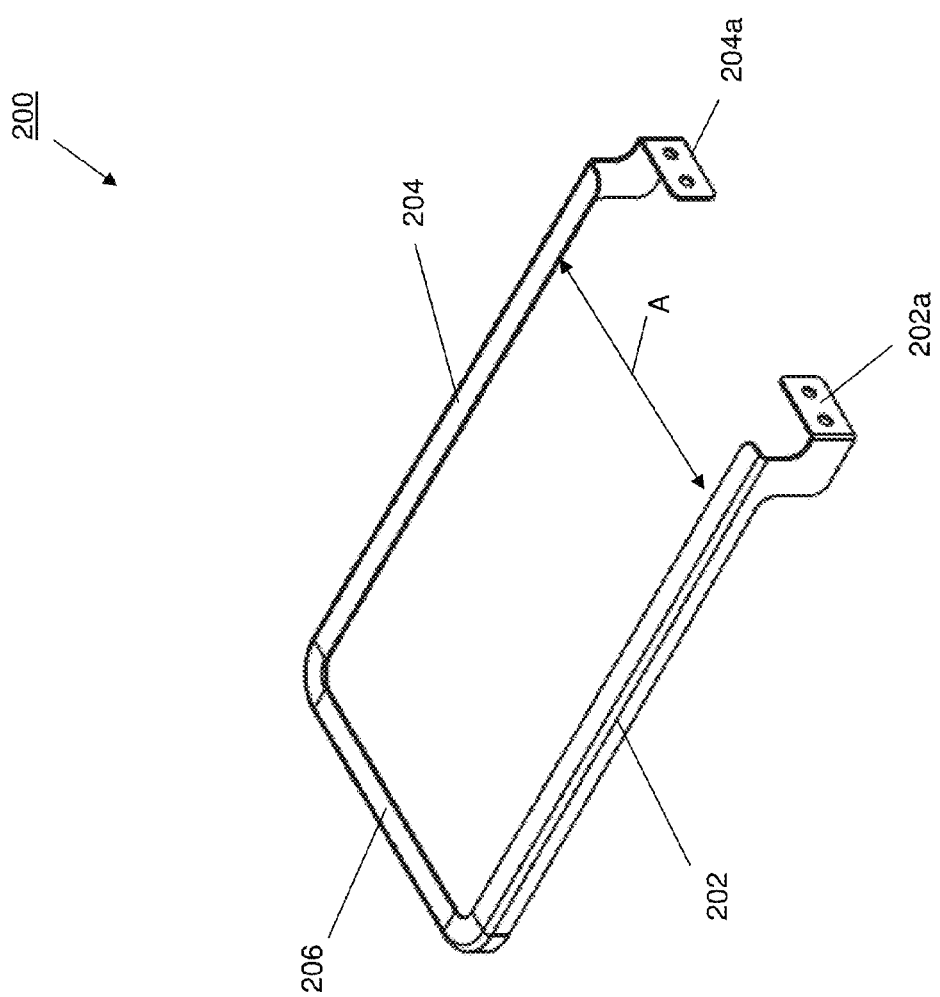
FIG. 2 is a perspective view illustrating an embodiment of a handle.
Figure 3:
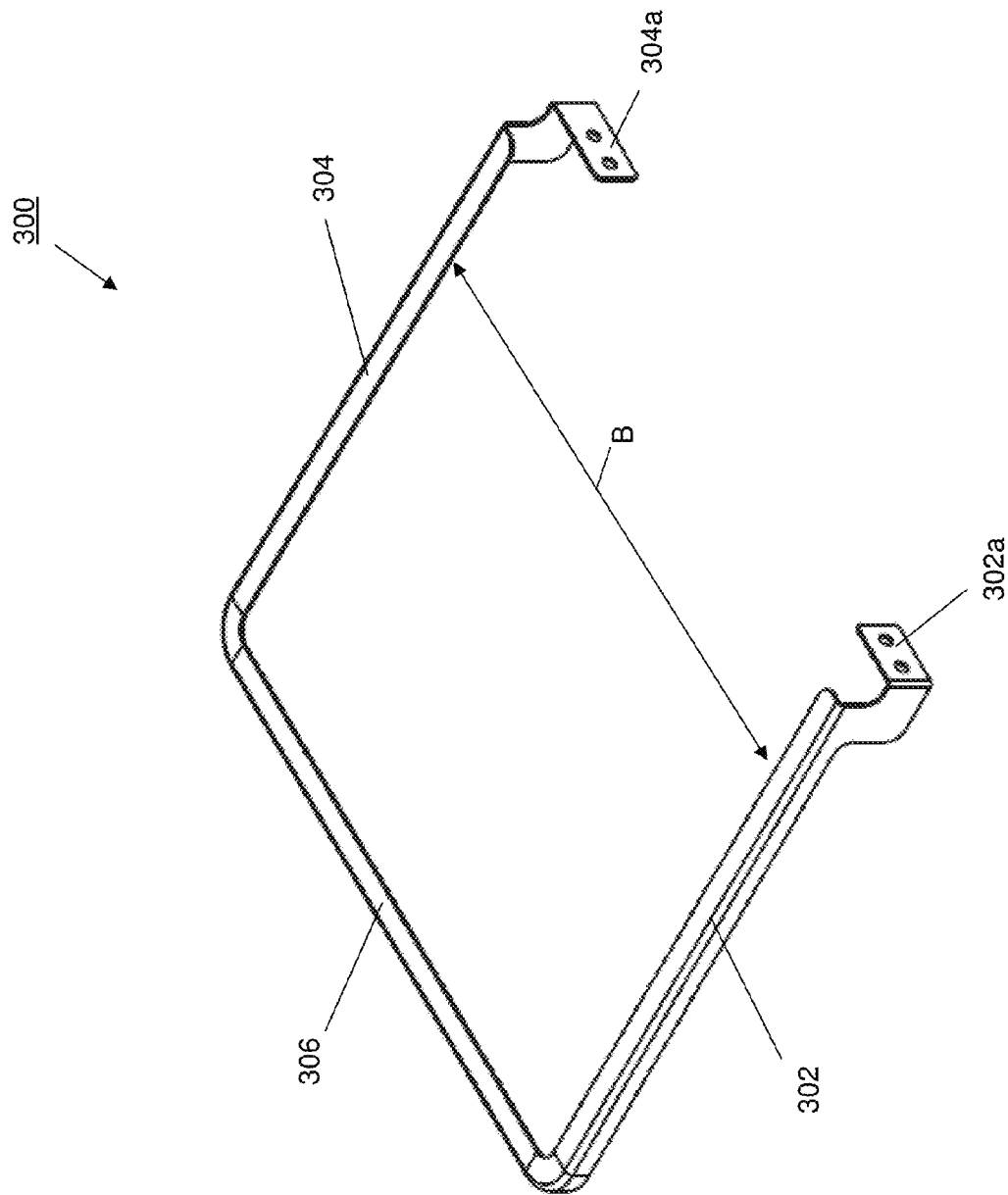
FIG. 3 is a perspective view illustrating an embodiment of a handle.

Referring now to FIG. 2, a handle 200 is illustrated. In an embodiment, the handle 200 includes a plurality of legs 202 and 204 that are coupled together in a substantially parallel, spaced-apart orientation by a top portion 206. Each of the plurality of legs 202 and 204 includes a beam coupling feature 202a and 204a, respectively, that is located on a distal end of a respective leg 202 and 204 on the handle 200 that is opposite that leg from the top portion 206. Referring now to FIG. 3, a handle 300 is illustrated. In an embodiment, the handle 300 includes a plurality of legs 302 and 304 that are coupled together in a substantially parallel, spaced-apart orientation by a top portion 306. Each of the plurality of legs 302 and 304 includes a beam coupling feature 302a and 304a, respectively, that is located on a distal end of a respective leg 302 and 304 on the handle 300 that is opposite that leg from the top portion 306. In one embodiment, handles 200 and 300 may be the same handle, and the top portion 206/306 may be an adjustable portion such that the distance between the leg 202/302 and the leg 204/304 may be varied, for example, from the distance A illustrated in FIG. 2 to the distance B illustrated in FIG. 3. In another embodiment, the handles 200 and 300 may be separate handles that may be manufactured and/or utilized to provide a cam system that is operable on two different IHS configurations, discussed in further detail below.

Figure 4:
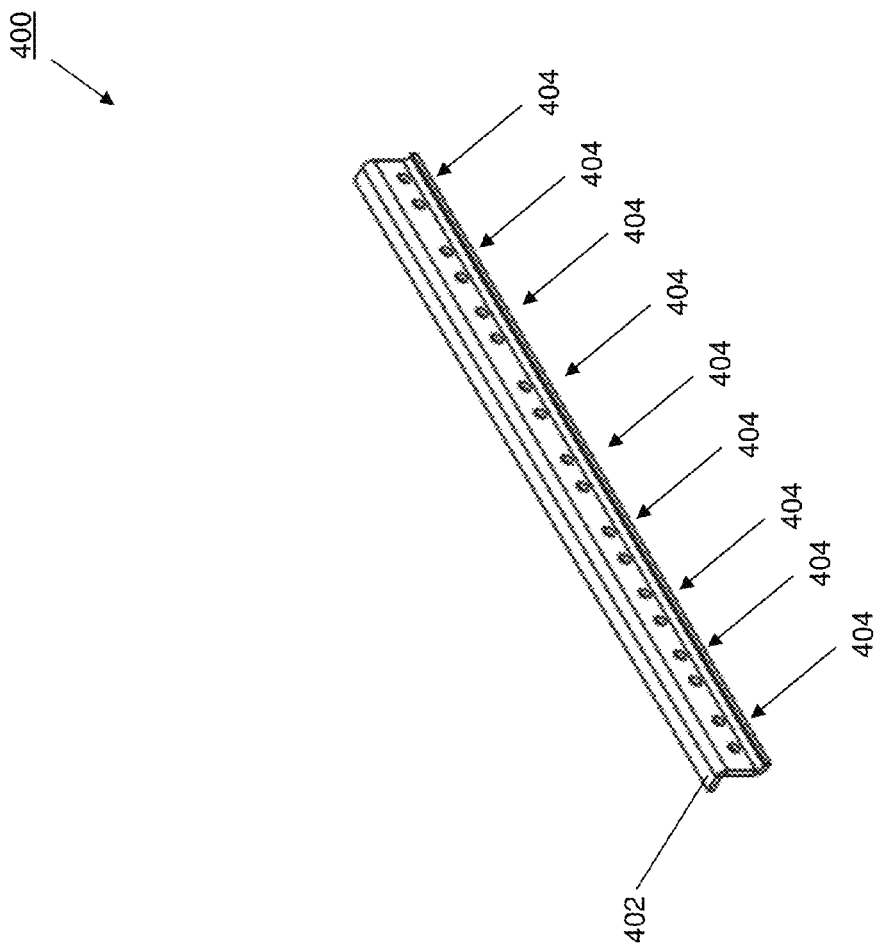
FIG. 4 is a perspective view illustrating an embodiment of a beam.

Referring now to FIG. 4, a beam 400 is illustrated. The beam 400 includes an elongated base 402 having a plurality of coupling features 404 located along its length. In the illustrated embodiment, the plurality of coupling features 404 are defined by the beam 400 and extend through the beam 400. While a specific beam 400 is illustrated and described, one of skill in the art will recognize that a variety of modification such as, for example, different beam shapes, coupling features, coupling feature locations, etc., will fall within the scope of the present disclosure.

Figure 5:
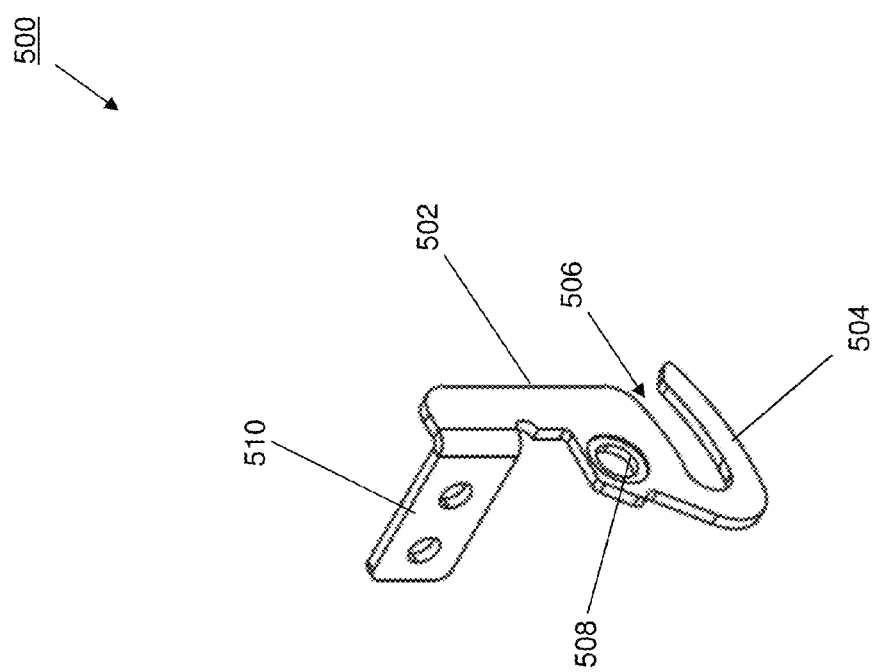
FIG. 5 is a perspective view illustrating an embodiment of a cam element.

Referring now to FIG. 5, a cam element 500 is illustrated. The cam element 500 includes a base 502. A cam feature 504 extends from the base 502 and, in the illustrated embodiment, includes an arcuate member that defines a cam channel 506 between the cam feature 504 and the base 502. The base 502 also includes a pivotable coupling 508 that, in the illustrated embodiment, includes an aperture defined by the base 502 and extending through the base 502. A beam coupling feature 510 extends from the base 502 opposite the base 502 from the cam feature 504. In an embodiment, a plurality of the cam elements 500 may be utilized to provide a cam system, discussed in further detail below.

Figure 6A:
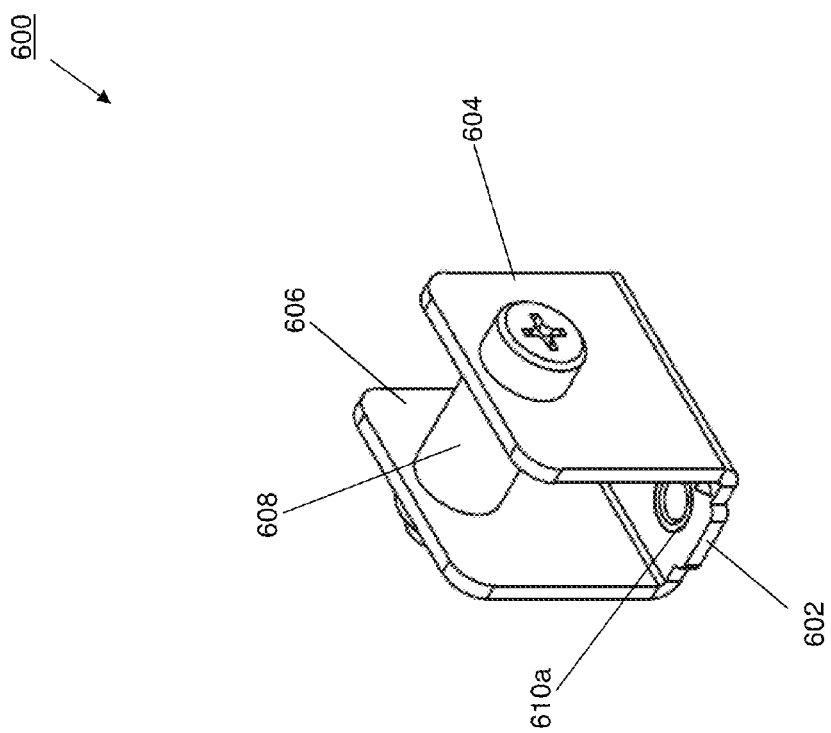
FIG. 6a is a top perspective view illustrating an embodiment of a cam bracket.
Figure 6B:
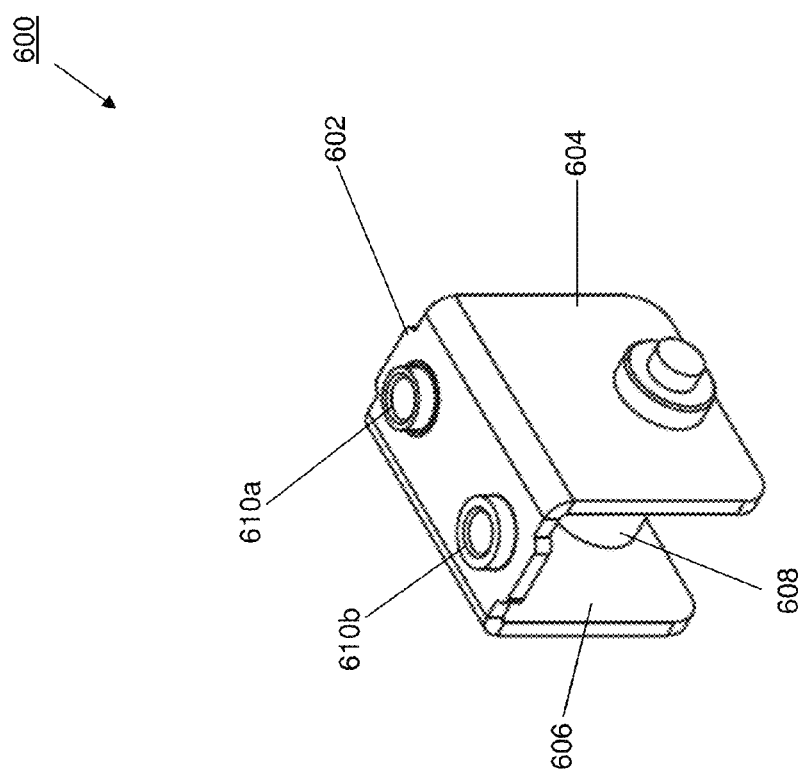

Referring now to FIGS. 6a and 6b, a cam bracket 600 is illustrated. The cam bracket 600 includes a base 602. A plurality of walls 604 and 606 extend from opposite sides of the base 602 in a substantially parallel orientation to each other. A cam engagement member 608 extends between the walls 604 and 606 in a spaced apart orientation from the base 602. In an embodiment, the cam engagement member 608 includes roller bearings that couple the cam engagement member 608 to the walls 604 and 606 such that, for example, the cam engagement member 608 may rotate about its longitudinal axis (which, in the illustrated embodiment, is perpendicular to the walls 604 and 606) relative to the cam bracket 600. The base 602 includes a plurality of board coupling features 610a and 610b that, in the illustrated embodiment, include apertures that are defined by the base 602 and that extend through the base 602. In an embodiment, a plurality of the cam brackets 600 may be utilized to provide a cam system, discussed in further detail below.

Figure 7:
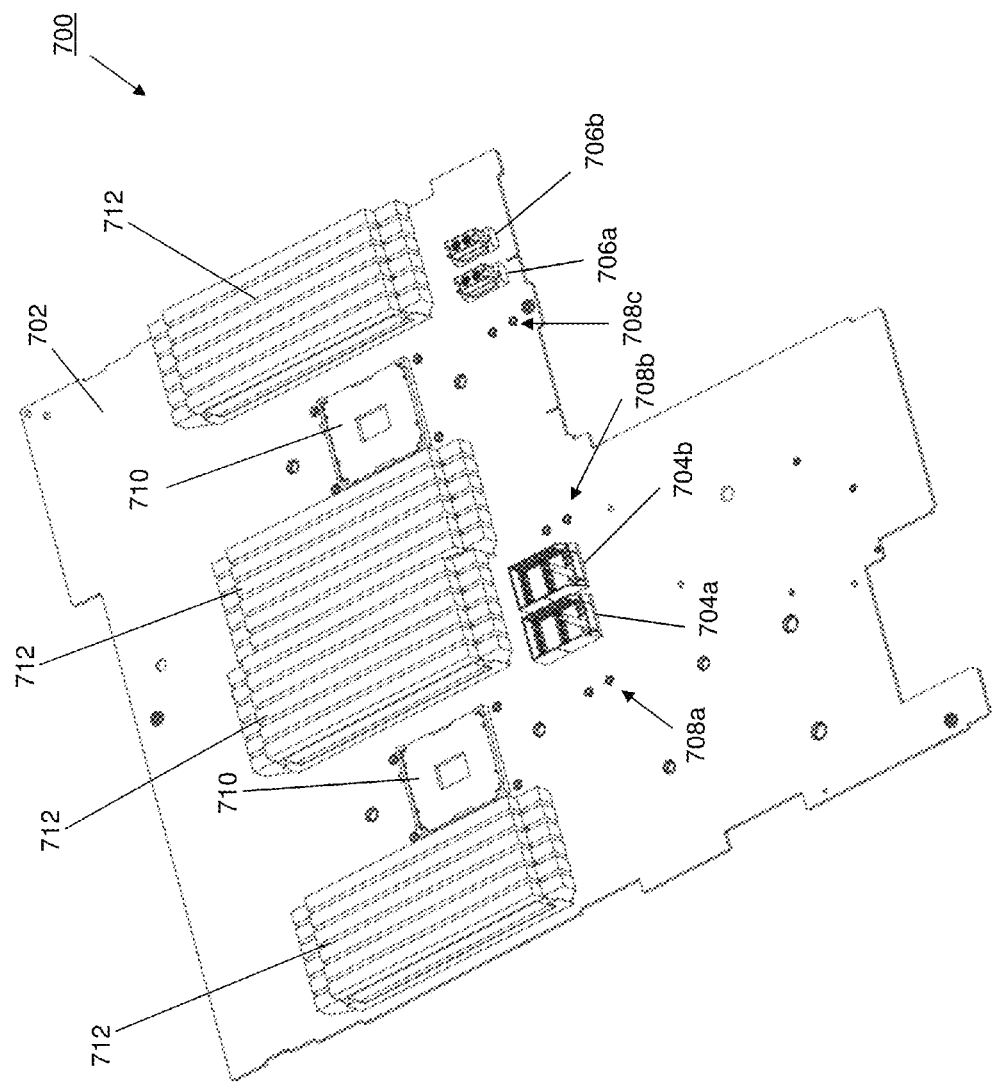
FIG. 7 is a perspective view illustrating an embodiment of a first member including a board with a connector.

Referring now to FIG. 7, a first member 700 is illustrated. In the illustrated embodiment, the first member 700 includes a circuit board 702 having a plurality of connectors 704a, 704b, 706a, and 706b. However, one of skill in the art will recognize that that the first member 700 may be a variety of other IHS components that can benefit from the cam system described below without departing from the scope of the present disclosure. A plurality of cam bracket couplers 708a, 708b, and 708c are located on the board 702 and, in the illustrated embodiment, include apertures that are defined by and extend through the board 702. In an embodiment, the cam bracket couplers 708a, 708b, and 708c may be positioned on the board 702 based on the requirements of the IHS and/or the cam system, as described in further detail below. In the illustrated embodiment, a plurality of processor couplings 710 (for coupling a processor such as, for example, the processor 102 described above with reference to FIG. 1, to the board 702) and a plurality of memory modules 712 are mounted to and coupled together through the board 702, positioned adjacent each other, and positioned adjacent and coupled to the connectors 704a, 704b, 706a, and 706b. One of skill in the art will recognize that any variety of IHS components may be coupled to the board 702 while remaining within the scope of the present disclosure.

Figure 8:
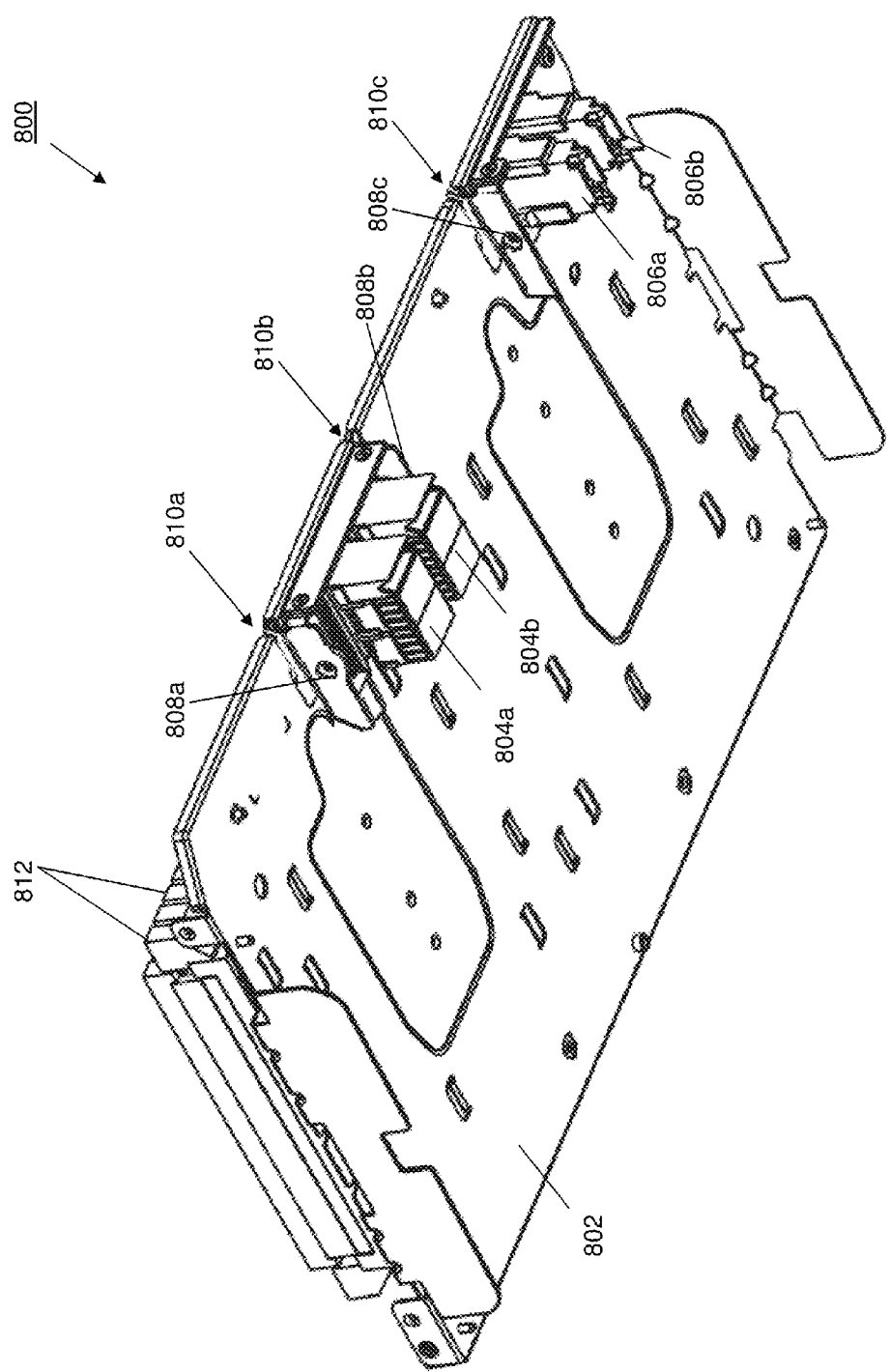
FIG. 8 is a perspective view illustrating an embodiment of a second member including a board with a connector.

Referring now to FIG. 8, a second member 800 is illustrated. In the illustrated embodiment, the second member 800 includes a circuit board 802 having a plurality of connectors 804a, 804b, 806a, and 806b. However, one of skill in the art will recognize that that the second member may be a variety of other IHS components that can benefit from the cam system described below without departing from the scope of the present disclosure. A plurality of pivotable couplers 808a, 808b (obscured), and 808c are coupled to the board 702 and, in the illustrated embodiment, include apertures that are defined by structural members that are located on the board 802. The board 802 defines a plurality of cam element slots 810a, 810b, and 810c that are located adjacent respective pivotable couplers 808a, 808b (obscured), and 808c. In the illustrated embodiment, a plurality of components 812 (e.g., a plurality of memory modules, processors, etc) are mounted to and coupled together through the board 802 and coupled to the connectors 804a, 804b, 806a, and 806b. One of skill in the art will recognize that any variety of IHS components may be coupled to the board 802 while remaining within the scope of the present disclosure.

Figure 9A:
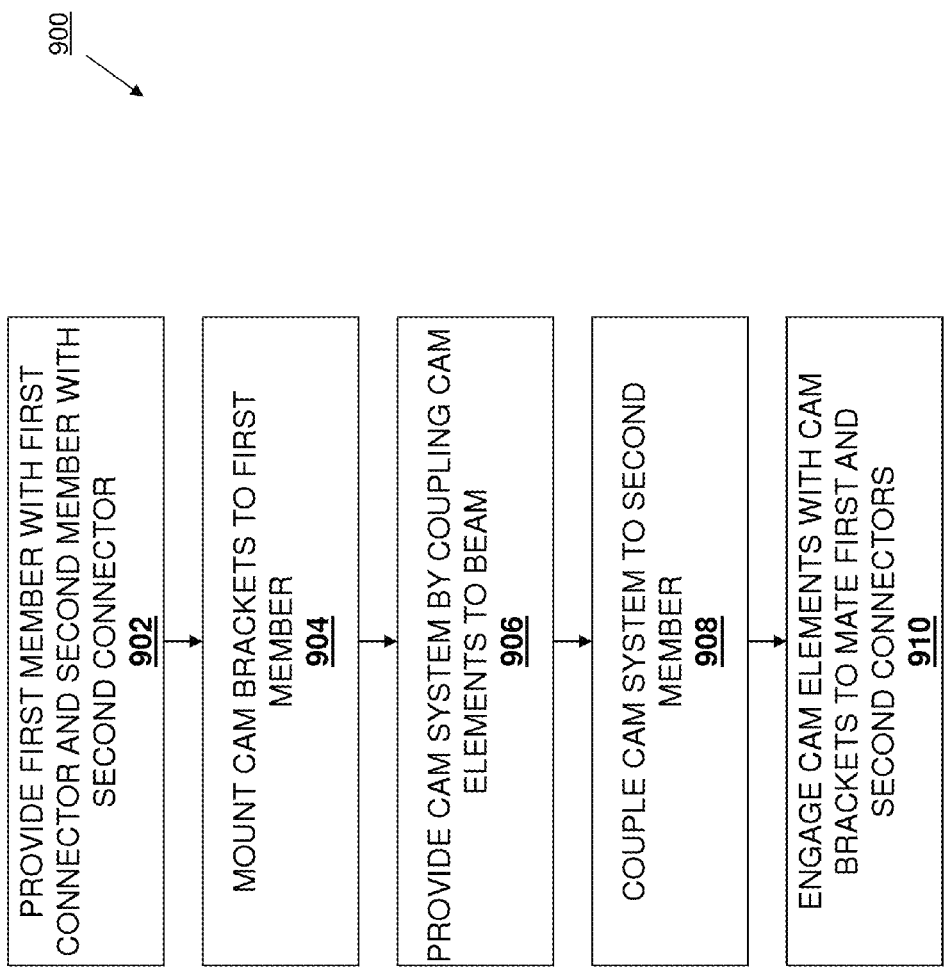
FIG. 9a is a flow chart illustrating an embodiment of a method for mating connectors.

Referring now to FIG. 9a, a method 900 for mating connectors is illustrated. The method 900 begins at block 902 where a first member with a first connector and a second member with a second connector are provided. In an embodiment, the first member 700 including the board 702 with the connectors 704a, 704b, 706a, and 706c, and the second member 800 including the board 802 with the connectors 804a, 804b, 806a, and 806b, are provided. In an embodiment, the first member 700 may be located in an IHS chassis such as, for example, the chassis 116 discussed above with reference to FIG. 1, and the cam system of the present disclosure may be provided to couple the second connectors on the second member 800 to the first connectors on the first member 700. In this embodiment, the IHS may include a number of limitations. For example, the first connectors on the first member 700 may be located on the board 702 such that they are in a central location in the IHS chassis away from the sidewalls of the IHS chassis, which may prevent or complicate the use of the side walls as a structural member for a cam system. In another example, the sidewalls of the IHS chassis may be used for cable routing, which may prevent or complicate the use of the side walls as a structural member for a cam system. In another example, the spacing of the plurality of connectors 704a, 704b, 706a, and 706b on the board 702 prevents or complicates the use of a single cam structure to support the cam system (e.g., adjacent the connectors 704a and 704b), as such as structure may provide proper cam forces to mate the second connectors on the second member 800 with the connectors 704a and 704b, but an insufficient cam force to mate the second connectors on the second member 800 with the connectors 706a and 706b. While the illustrated embodiment of the method 900 below involves mating connectors on a plurality of board together, the method 900 should not be limited to this embodiment, as a wide variety of members, components, and/or connectors may be mated and/or other wise coupled together using the cam system of the present disclosure.

Figure 9B:
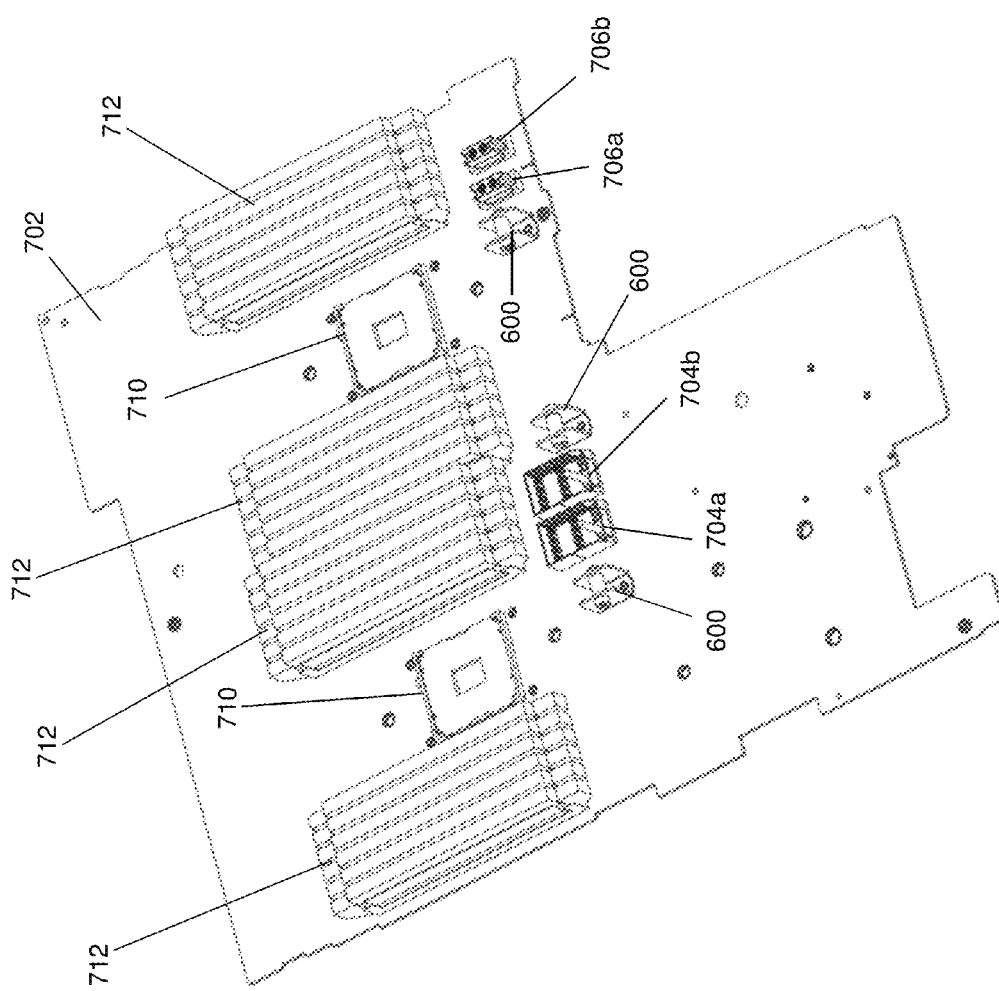
FIG. 9b is a perspective view illustrating an embodiment of the cam brackets of FIG. 6 coupled to the first member of FIG. 7.

Referring now to FIGS. 9a and 9b, the method 900 then proceeds to block 904 where cam brackets are mounted to the first member. In an embodiment, a plurality of cam brackets 600 are mounted to the board 702 of the first member 700 using the board coupling features 610a and 610b on the cam brackets 600 and the bracket couplers 708a, 708b, and 708c on the board 702 (e.g., using screws, rivets, pins, nuts/bolts, and/or other coupling devices known in the art), as illustrated in FIG. 9b. In the illustrated embodiment, a pair of cam brackets 600 are mounted to the board 702 on either side of the pair of connectors 704a and 704b, and a cam bracket 600 is mounted adjacent the connector 706a. However, one of skill in the art will recognize that the positioning of the cam brackets 600 on the board 702 may be modified depending on the configuration of the board 702, the force requirements of the connectors 704a, 704b, 706a, and 706b, etc. For example, depending on the positioning of the connectors 704a, 704b, 706a, and 706b, the configuration of the first member 700 (e.g., the board 702, the components 710 and 712 on the board 702, etc.), the configuration of the second member 800 (e.g., the board 802, the components 812 on the board 802, etc.), the types of connectors 704a, 704b, 706a, and 706b, and/or a variety of other limitations known in the art, the number and location of the bracket couplers may be provided on the board 702 to allow the cam system to function as desired, as described in further detail below.

Figure 9C:
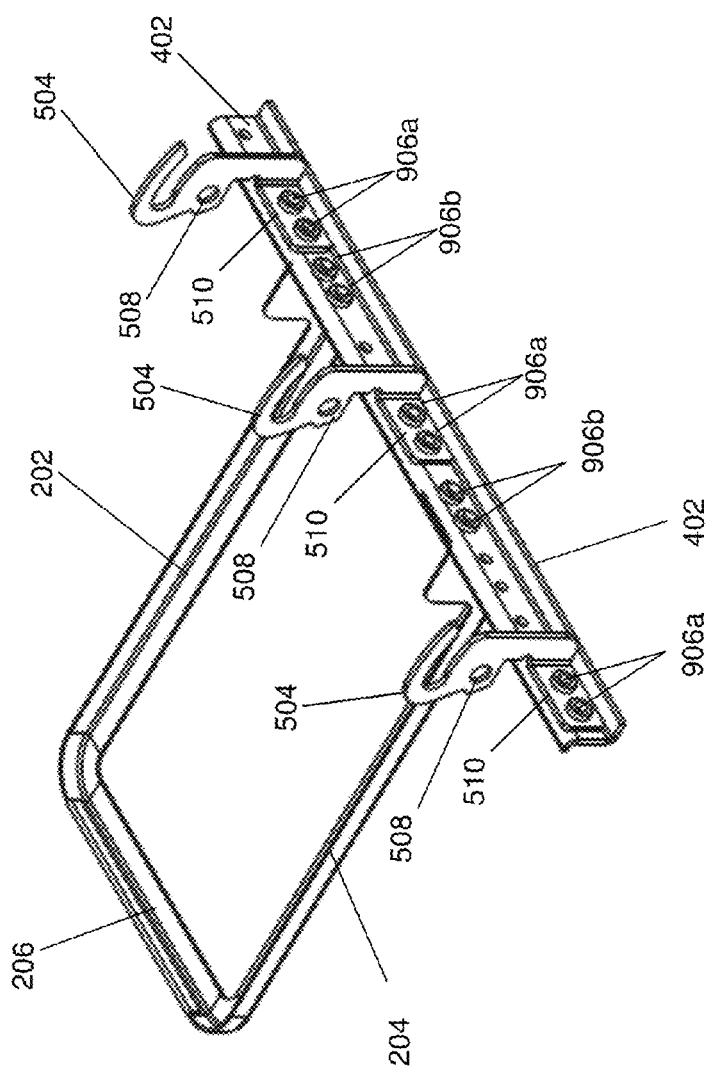
FIG. 9c is a bottom perspective view illustrating an embodiment of the handle of FIG. 2 and the cam elements of FIG. 5 coupled to the beam of FIG. 4 to provide a cam system.
Figure 9D:
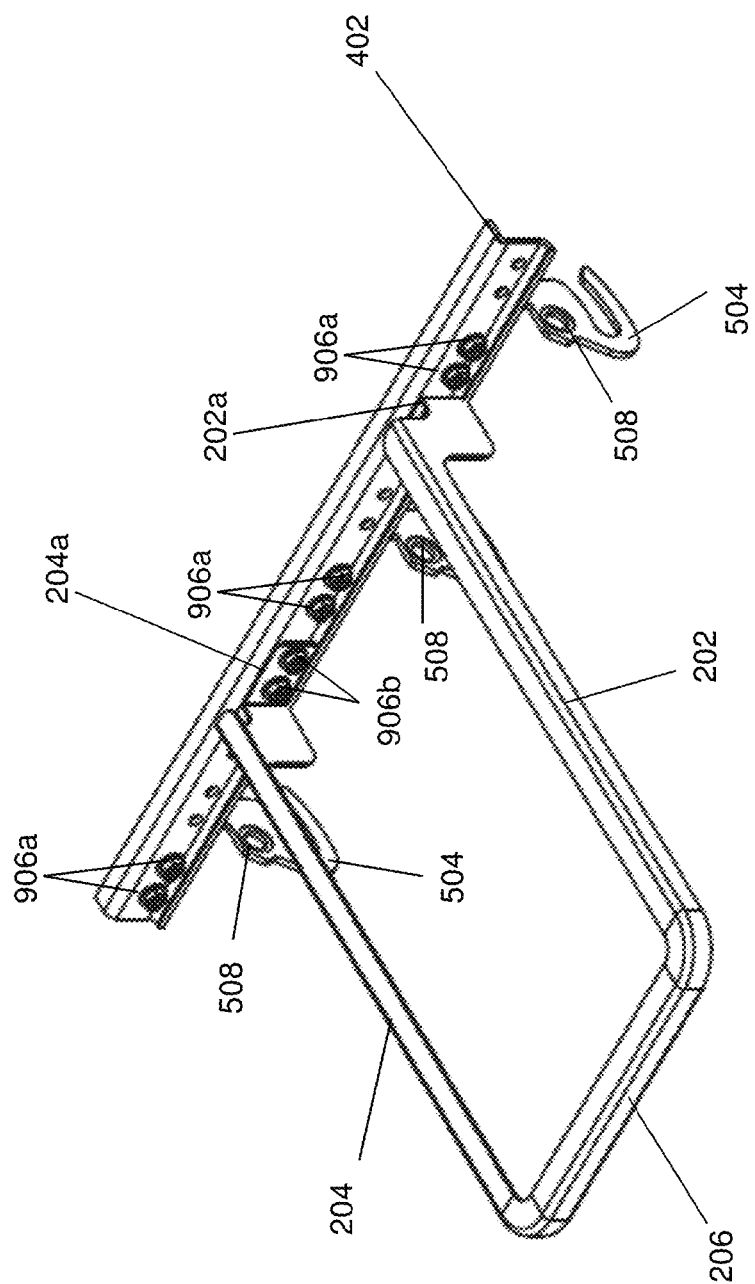
FIG. 9d is a top perspective view illustrating an embodiment of the handle of FIG. 2 and the cam elements of FIG. 5 coupled to the beam of FIG. 4 to provide a cam system.

Referring now to FIGS. 9a, 9c, and 9d, the method 900 then proceeds to block 906 where a cam system is provided by coupling cam elements to the beam. A plurality of the cam elements 500 may be coupled to the beam 400 by positioning the beam coupling feature 510 on the cam element 500 adjacent a respective coupling feature 404 on the beam 400 and using coupling members 906a (e.g., screws, rivets, pins, nuts/bolts, and/or other coupling devices known in the art) to secure the cam element 500 to the beam 400, as illustrated in FIGS. 9c and 9d. As can be seen, the coupling features 404 on the beam 400 allow the cam elements 500 to be positioned at multiple locations along the length of the beam 400, and the positioning of the cam elements 500 on the beam 400 is selected to match the spacing of the cam brackets 600 on the board 702 of the first member 700 (illustrated in FIG. 9b). At block 906, the handle 200 may also be coupled to the beam 400 by positioning the beam coupling features 202a and 204a on the legs 202 and 204, respectively, of the handle 200 adjacent respective coupling features 404 on the beam 400 and using coupling members 906b (e.g., screws, rivets, pins, nuts/bolts, and/or other coupling devices known in the art) to secure the handle 200 to the beam 400, as illustrated in FIGS. 9c and 9d. As can be seen, the coupling features 404 on the beam 400 allow the handle 200 to be positioned at multiple locations along the length of the beam 400. In an embodiment, the positioning of the handle 200 on the beam 400 is selected based on the configuration of the second member 800 (e.g., the board 802, the components 812 on the board 802, etc.), the configuration of the IHS chassis, and/or a variety of other limitations known in the art. In an embodiment, the handle 200 may be an integral portion of the beam 400. In an embodiment, the coupled-together handle, beam, and cam elements provide a cam system.

Figure 9E:
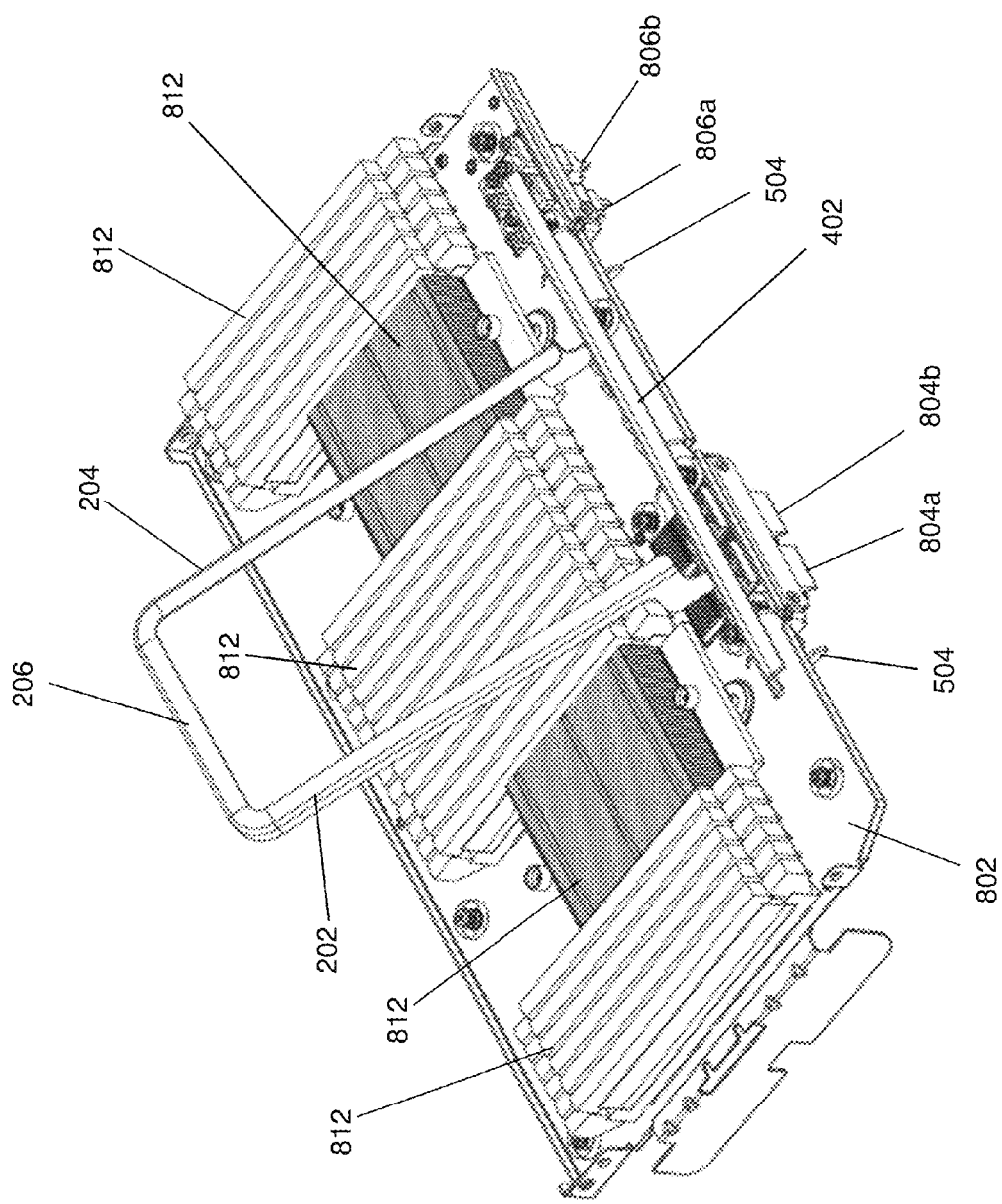
FIG. 9e is a perspective view illustrating an embodiment of the cam system of FIGS. 9c and 9d coupled to the second member of FIG. 8.
Figure 9J:
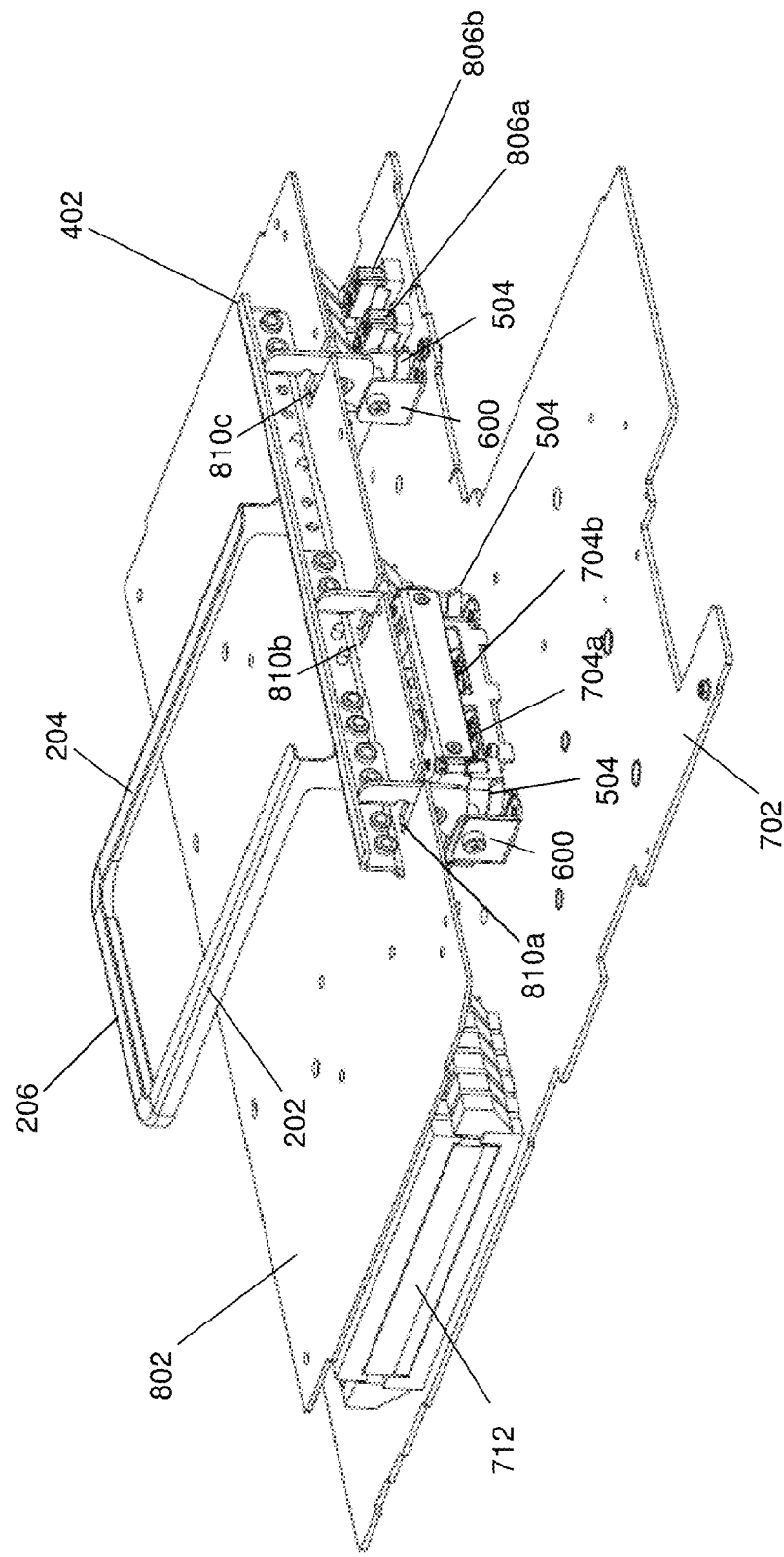
FIG. 9j is a perspective view illustrating an embodiment of the connectors on the first member of FIG. 7 coupled to the connectors on the second member of FIG. 8 using the cam system of FIGS. 9c and 9d.

Referring now to FIGS. 9a, 9e, and 9f, the method 900 then proceeds to block 908 where the cam system is coupled to the second member. The cam system including the coupled-together handle 200, beam 400, and cam elements 500 are positioned relative to the second member 800 such that the cam elements 500 extend through the cam element slots 810a, 810b, and 810c defined by the board 802 and the pivotable coupling 508 on each cam element 500 is located adjacent a respective pivotable coupler 808a, 808b, and 808c on the board 802. The cam elements 500 may then be pivotally coupled to the board 802 using, for example, a pivotal coupling member 908a that may be inserted through the pivotable coupling 508 on the cam member 500 and the pivotable coupler on the board 802, as illustrated in FIG. 9f.

Figure 9K:
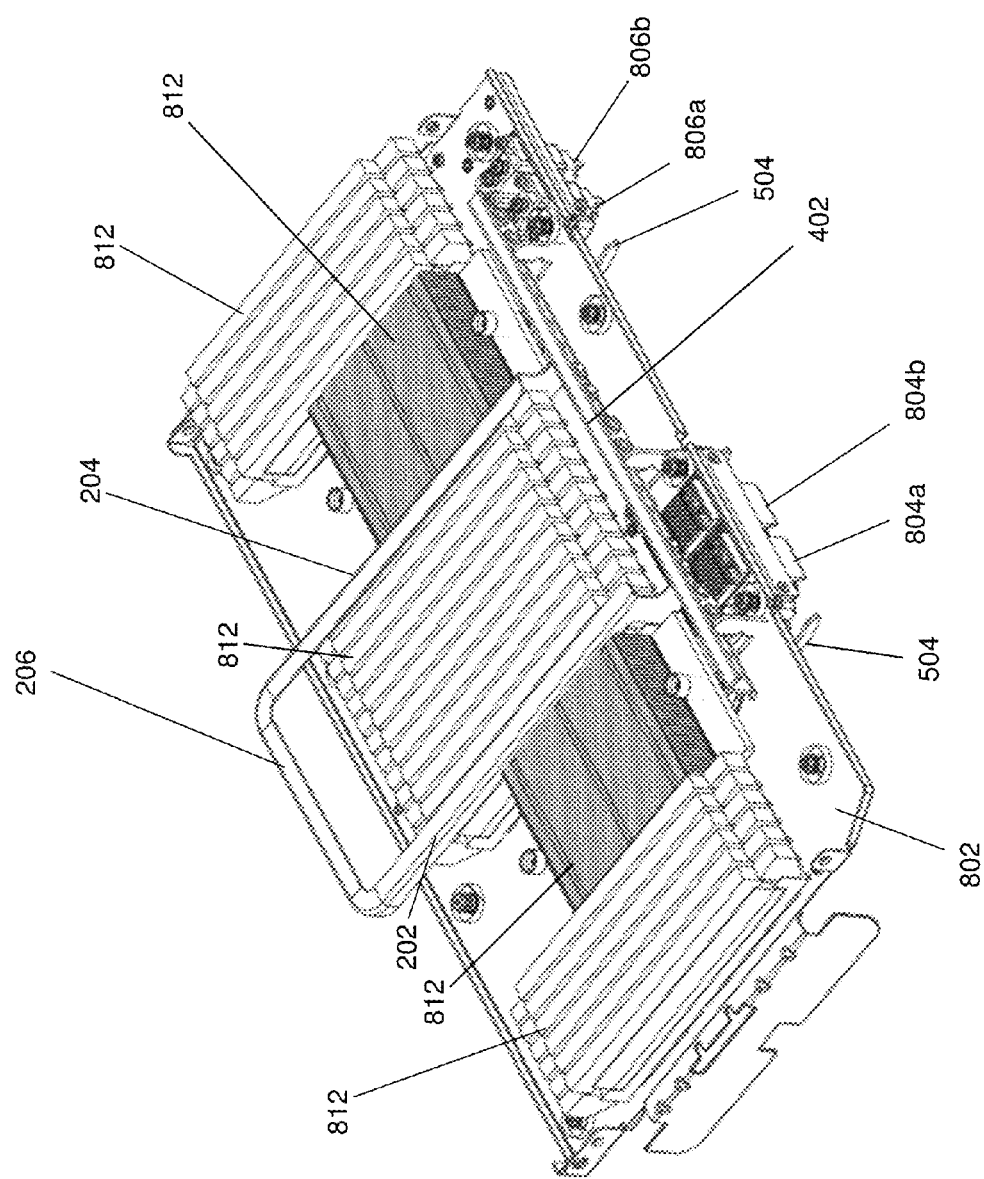
FIG. 9k is a perspective view illustrating an embodiment of the handle of the cam system of FIGS. 9c and 9d in a closed position on the second member of FIG. 8.

Referring now to FIGS. 9a, 9g, 9h, 9i, 9j, and 9k, the method 900 then proceeds to block 910 where the cam elements are engaged with the cam brackets to mate the first and second connectors. With the cam system coupled to the second member 800, the second member 800 is positioned adjacent the first member 700 such that the connectors 804a, 804b, 806a and 806b on the board 802 are aligned with the connectors 704a, 704b, 706a, and 706b, respectively, on the board 702, as illustrated in FIG. 9g. Due to the positioning of the cam brackets 600 on the board 702 in block 904 of the method 900 and the positioning of the cam elements 500 on the beam 400 in block 906 of the method 900, alignment of the connectors on the boards 702 and 802 results in the cam elements 500 on the cam system coupled to the board 802 being aligned with the cam brackets 600 on the board 702. The handle 200 may then be engaged to rotate the cam system about the pivotal coupling of the cam elements 500 to the board 802 in a direction A. Movement of the handle 200 in the direction A moves each of the cam elements 500 from a position B, with the cam channel 506 and the cam feature 504 spaced apart from the cam engagement member 608 on the cam bracket 600, illustrated in FIG. 9h, to a position C where the cam engagement member 608 on the cam bracket 600 has entered the cam channel 506 and engaged the cam feature 504, illustrated in FIG. 9i. One of skill in the art will recognize that the movement of the cam elements 500 from the position B to the position C, along with the coupling of the cam elements 500 to the board 802, will provide a cam force D that directs the board 802 towards the board 702. In an embodiment, the cam system is configured to provide the cam force D that is sufficient to mate the connectors 804a, 804b, 806a and 806b on the board 802 with the connectors 704a, 704b, 706a, and 706b, respectively, on the board 702. With the connectors 704a, 704b, 706a, and 706b mated with the connectors 804a, 804b, 806a, and 806b, respectively, the components 812 on the board 802 are coupled to the components 710 and 712 (and, in some embodiments, other components) on the board 702. Furthermore, as can be seen in FIG. 9k, rotation of the handle 200 in the direction A such that the cam elements move to the position C causes the handle 200 to move from an open position to a closed position that is substantially parallel to the board 802. As discussed above, the handle 200 may be positioned on the beam 400 in the cam system based on the configuration of the second member 800, and FIG. 9k illustrates a positioning of the handle 200 on the beam 400 that allows the handle 200 to move the cam elements 500 to the position B while ensuring that the handle 200 does not interfere with the components 812 on the board 802.

Thus, a cam system is provided that includes modular elements that allow the cam system to be modified to fit limitations of different IHSs. Cam brackets may be positioned on a board, cam elements may be positioned on a beam, and a handle may be configured and/or positioned on the beam in order to provide a cam system that provides a sufficient cam force to mate connectors while also conforming the cam system to the limitations of the IHS. The modular elements and configurability of the cam system allow an IHS manufacturer to use the same modular elements to provide the cam system on a variety of different IHSs, an example of which is described below.

Figure 10:
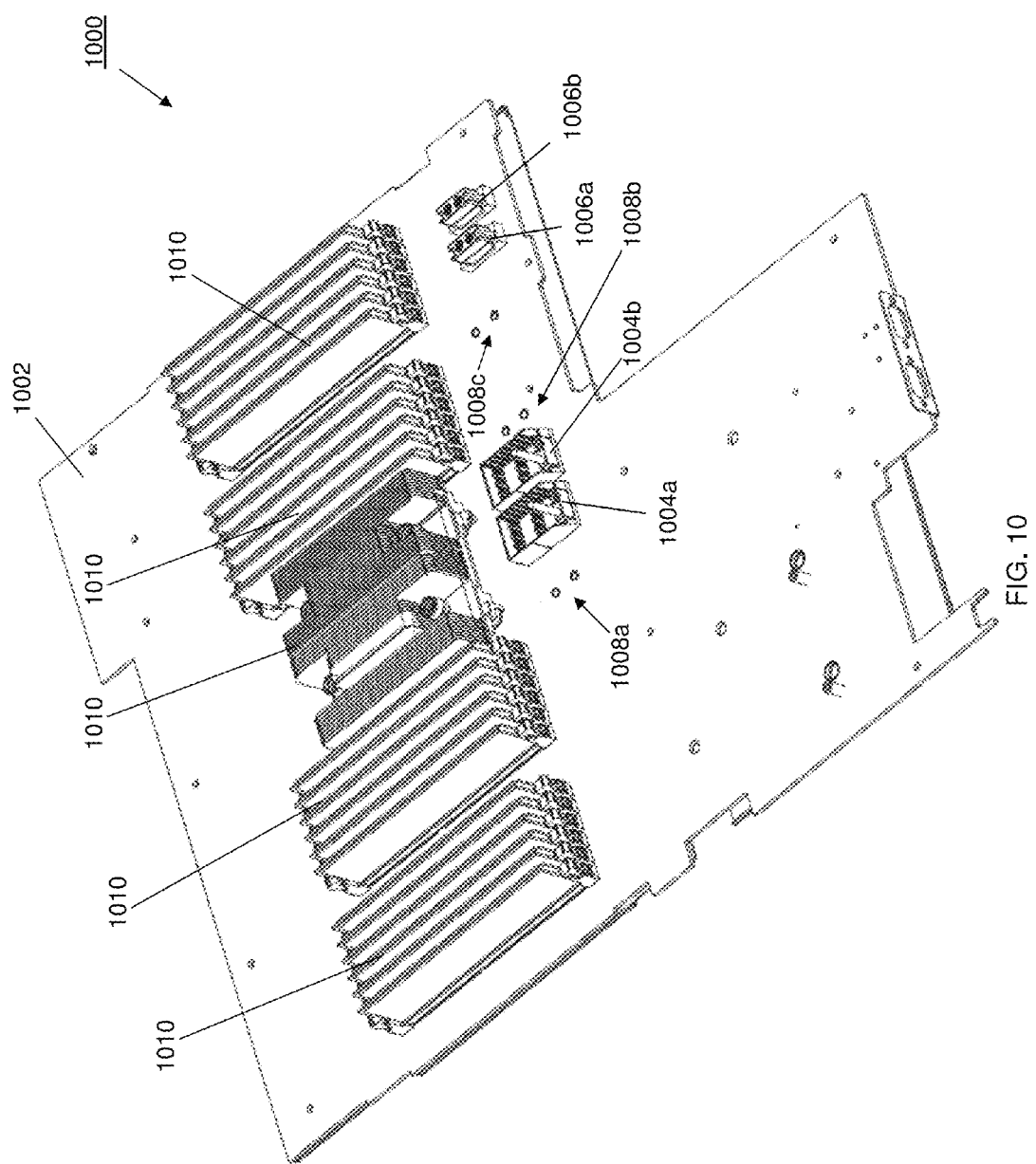
FIG. 10 is a perspective view illustrating an embodiment of a first member including a board with a connector.

Referring now to FIG. 10, a first member 1000 is illustrated. In the illustrated embodiment, the first member 1000 includes a circuit board 1002 having a plurality of connectors 1004a, 1004b, 1006a, and 1006b. However, one of skill in the art will recognize that that the first member may be a variety of other IHS components that can benefit from the cam system described above without departing from the scope of the present disclosure. A plurality of cam bracket couplers 1008a, 1008b, and 1008c are located on the board 1002 and, in the illustrated embodiment, include apertures that are defined by and extend through the board 1002. In the illustrated embodiment, a plurality of components 1010 are mounted to the board 1002, positioned adjacent and coupled to each other through the board 1002, and positioned adjacent and coupled to the connectors 1004a, 1004b, 1006a, and 1006b. One of skill in the art will recognize that any variety of IHS components may be coupled to the board 1002 while remaining within the scope of the present disclosure. One of skill in the art will recognize that the first member 1000 is substantially similar to the first member 700, described above with reference to FIG. 7, but with the connectors 1004a, 1004b, 1006a, and 1006b and the cam bracket couplers 1008a, 1008b, and 1008c configured and/or positioned differently.

Figure 11:
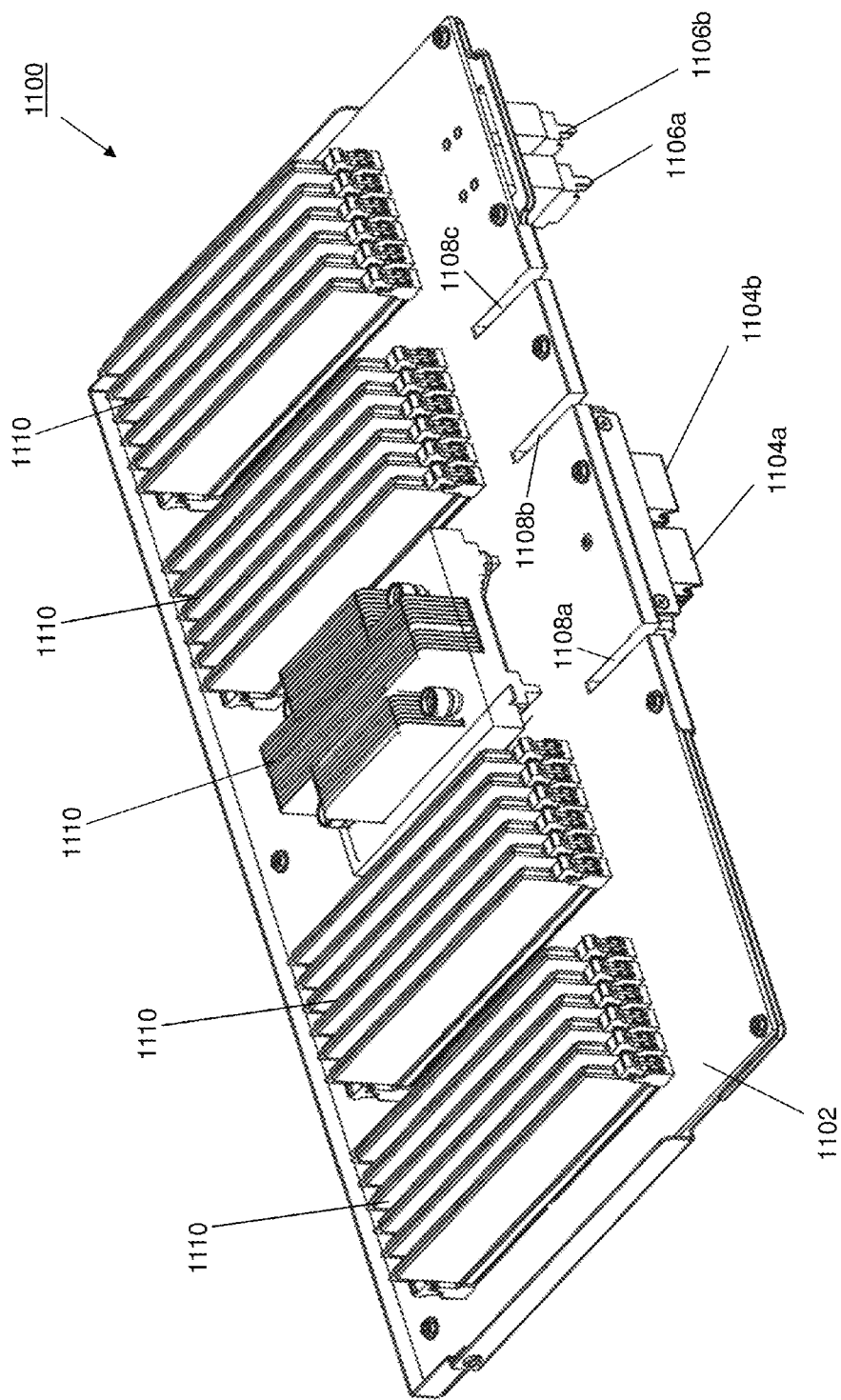
FIG. 11 is a perspective view illustrating an embodiment of a second member including a board with a connector.

Referring now to FIG. 11, a second member 1100 is illustrated. In the illustrated embodiment, the second member 1100 includes a circuit board 1102 having a plurality of connectors 1104a, 1104b, 1106a, and 1106b. However, one of skill in the art will recognize that that the second member may be a variety of other IHS components that can benefit from the cam system described above without departing from the scope of the present disclosure. Similar to the second member 800, the second member 1100 includes plurality of pivotable couplers (not illustrated) coupled to the board 1102 adjacent the connectors 1104a, 1104b, and 1106a, and the board 1102 defines a plurality of cam element slots 1108a, 1108b, and 1108c that are located adjacent respective pivotable couplers. In the illustrated embodiment, a plurality of components 1110 (e.g., a plurality of memory modules, processors, etc) are located on the board 1102 and coupled to each other and the connectors 1104a, 1104b, 1106a, and 1106b through the board 1102. One of skill in the art will recognize that the second member 1100 is substantially similar to the second member 800, described above with reference to FIG. 8, but with the connectors 1104*a*, 1104*b*, 1106*a*, and 1106*b*, the pivotable couplers, and the cam element slots 1108*a*, 1108*b*, and 1108*c* in different positions. Furthermore, the components 1110 may differ from and are positioned differently than the components 812 on the board 802.

Figure 12A:
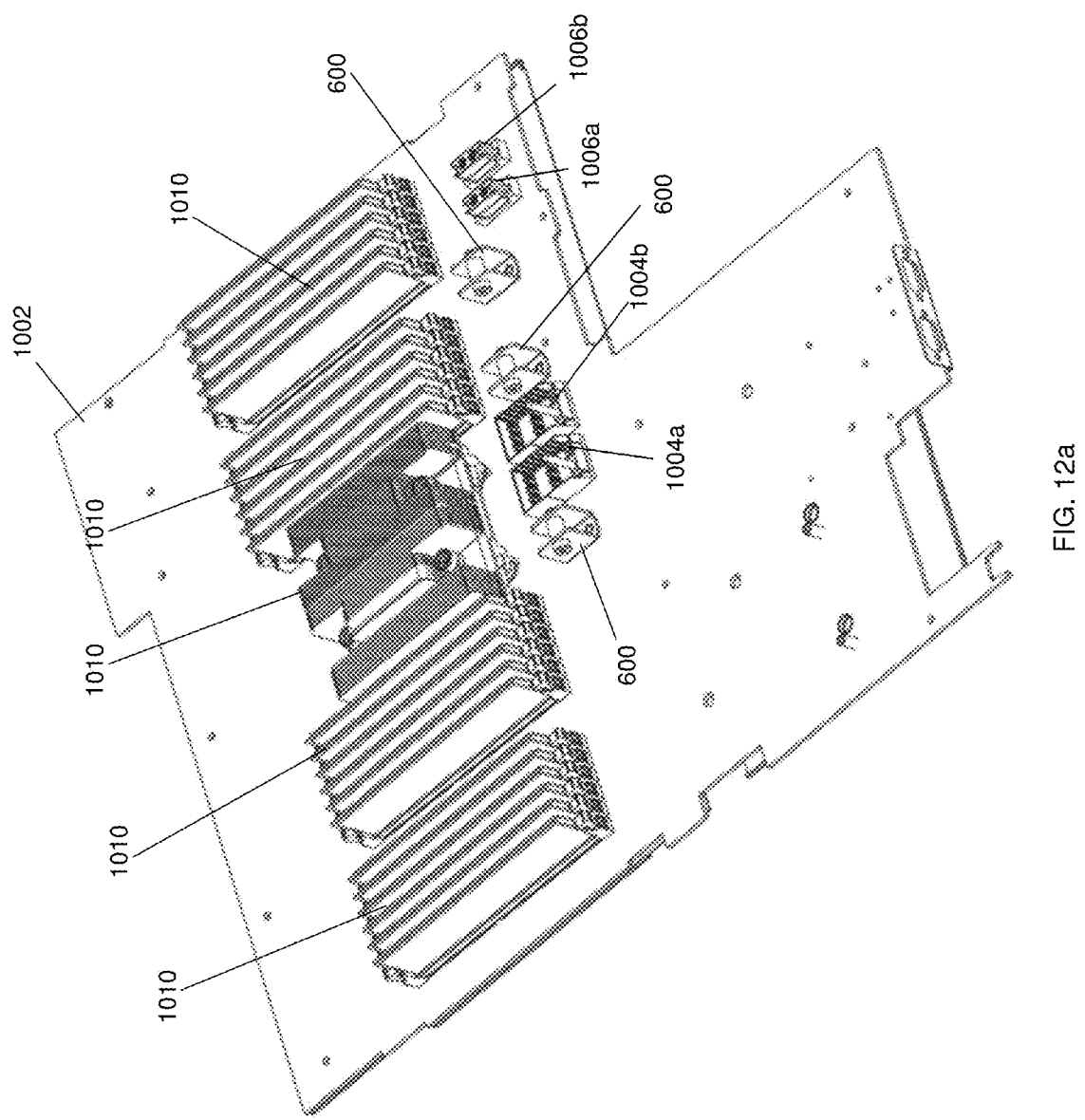
FIG. 12a is a perspective view illustrating an embodiment of the cam brackets of FIG. 6 coupled to the first member of FIG. 10.
Figure 12C:
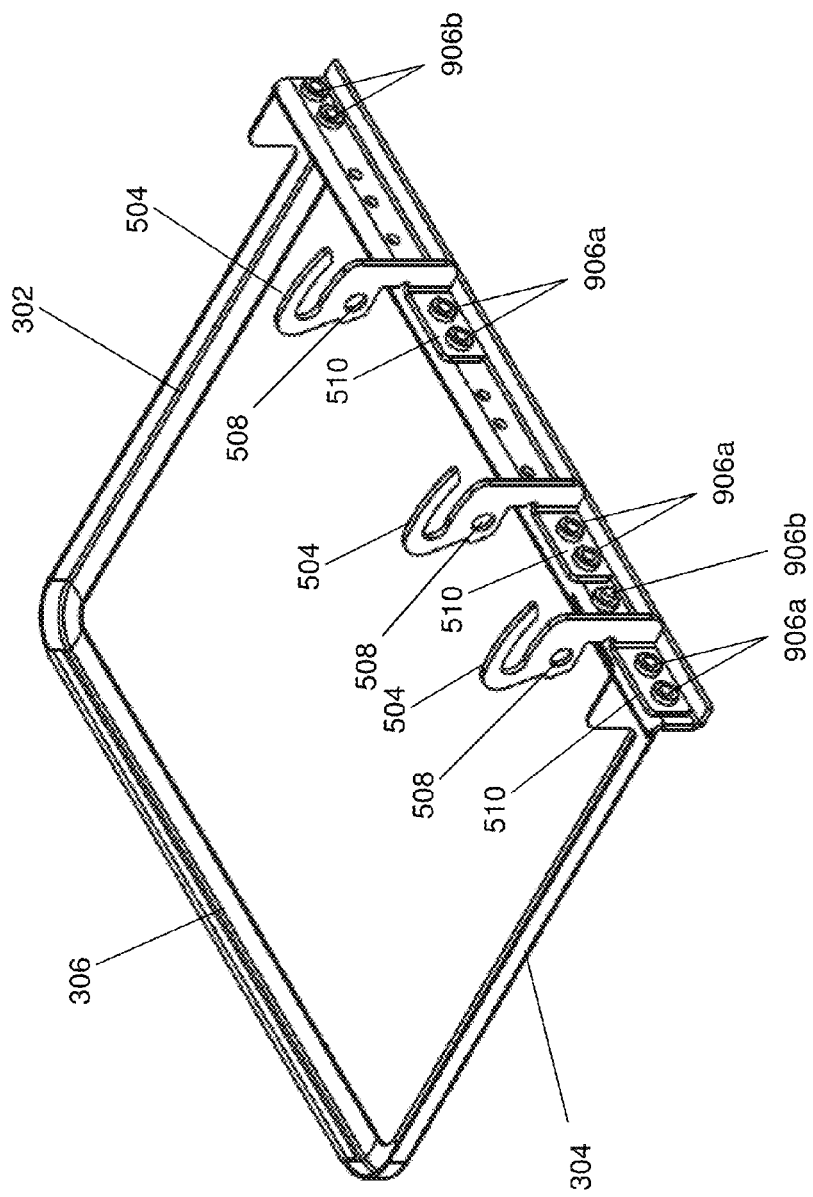
FIG. 12c is a bottom perspective view illustrating an embodiment of the handle of FIG. 3 and the cam elements of FIG. 5 coupled to the beam of FIG. 4 to provide a cam system.

While the first member 1000 and the second member 1100 differ from the first member 700 and the second member 800, the cam system discussed above may still be used to couple the connectors 1004*a*, 1004*b*, 1006*a*, and 1006*b* on the board 1002 to the connectors 1104*a*, 1104*b*, 1106*a*, and 1106*b*, respectively, on the board 1102. The method 900 may operate substantially as described above, but with the first member 1000 and the second member 1100 provided at block 902 and the cam brackets 600 coupled to the first member 1000 using the board coupling features 610*a* and 610*b* on the cam brackets 600 and the cam bracket couplers 1008*a*, 1008*b*, and 1008*c* on the board 1002, as illustrated in FIG. 12*a*.

Figure 12D:
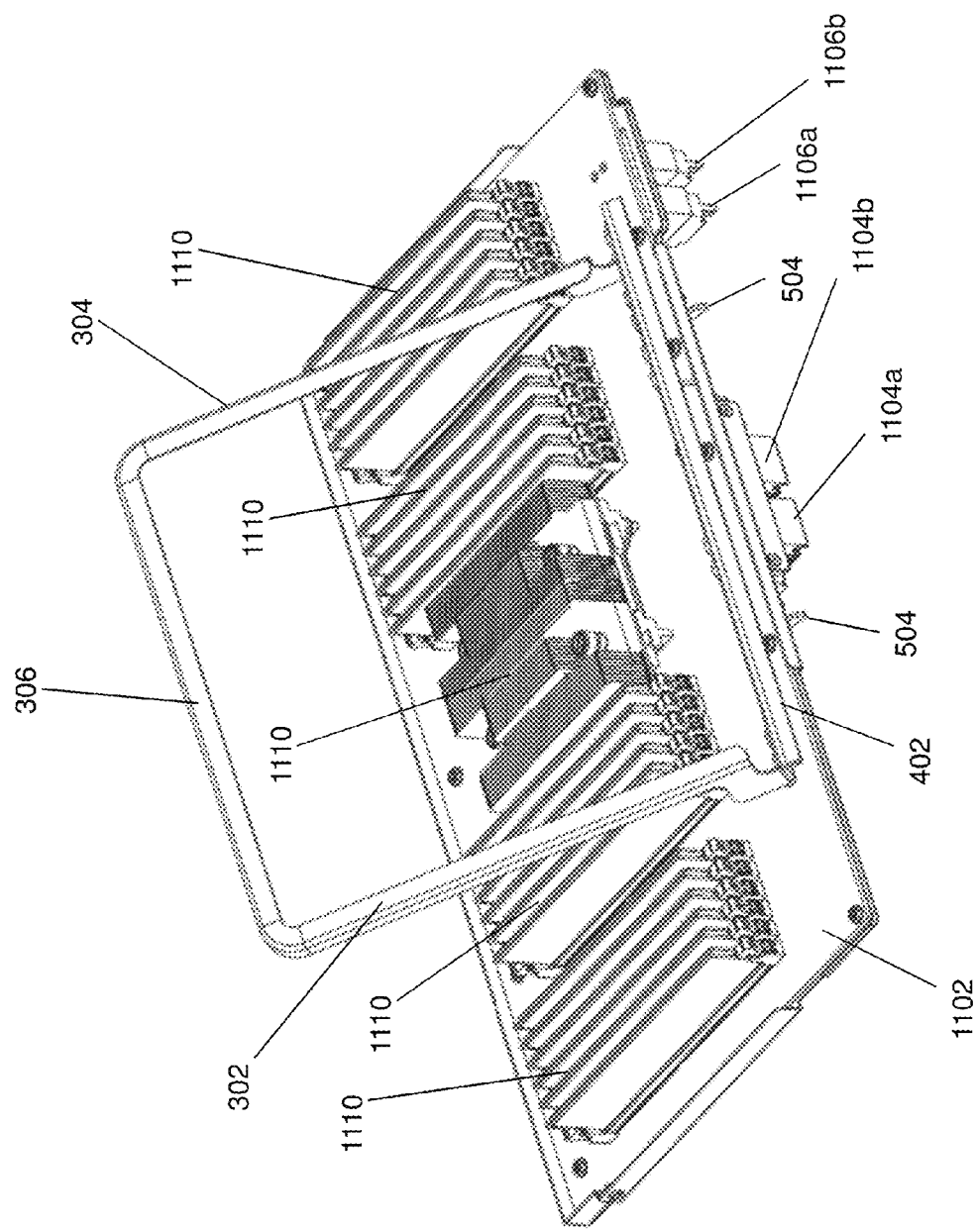
FIG. 12d is a perspective view illustrating an embodiment of the cam system of FIGS. 12b and 12c coupled to the second member of FIG. 11 with the handle in an open position.
Figure 12E:
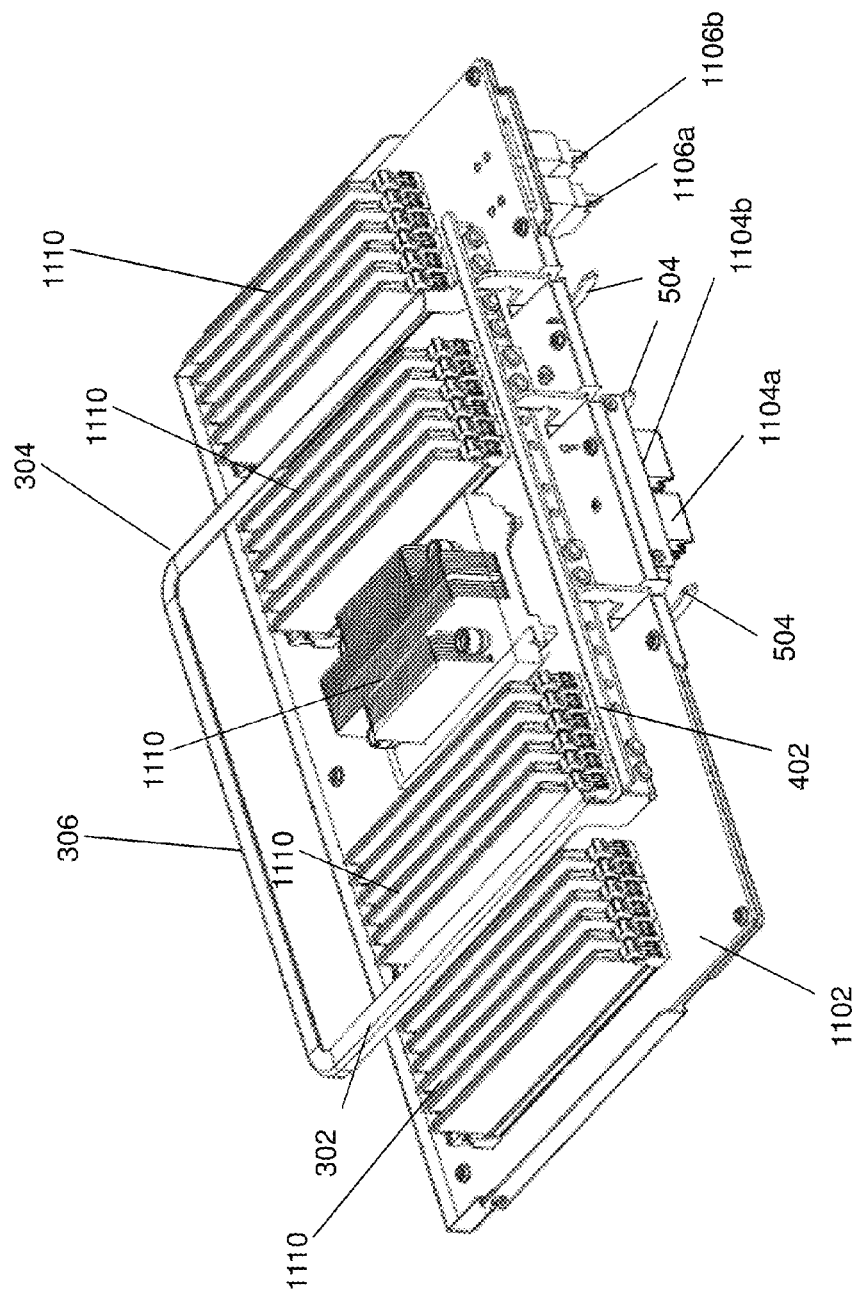
FIG. 12e is a perspective view illustrating an embodiment of the cam system of FIGS. 12b and 12c coupled to the second member of FIG. 11 with the handle in a closed position.

At block 906 of the method 900, the cam elements 500 may be coupled to the beam 400 substantially as described above. Furthermore, the handle 300 may be coupled to the beam 400 in substantially the same manner as described above for the handle 200. In one embodiment, the handle 200 and the handle 300 are the same handle, and the top portion 206/306 may be adjusted to vary the distance between the legs 202/302 and 304/304, as discussed above, in order to configure the handle 200/300 such that it may be used with whatever limitations exists on the IHS, the boards 1002 and 1102, etc. In another embodiment, the handle 300 is different from the handle 200 and manufactured for use with systems that have the configuration provided by the first member 1000 and the second member 1100. At can be seen in FIGS. 12*d* and 12*e*, with the cam system that includes the handle 300, the beam 400, and the cam elements 500, pivotally coupled to the second member 1100 in a similar manner as described above for block 908 in the method 900. The handle 300 may then be pivoted to engage the cam elements 500 with cam brackets 600 on the first member 1000 in order to provide the cam force necessary to mate the connectors 1004*a*, 1004*b*, 1006*a*, and 1006*b* on the board 1002 to the connectors 1104*a*, 1104*b*, 1106*a*, and 1106*b*, respectively, on the board 1102, as described above for block 910 in the method 900. Furthermore, as can be seen in FIG. 12*e*, with the connectors on the boards mated, the configuration of the handle 300 and cam system ensures that the handle 300 does not interfere with the components 1110 on the board 1102.

Figure 13:
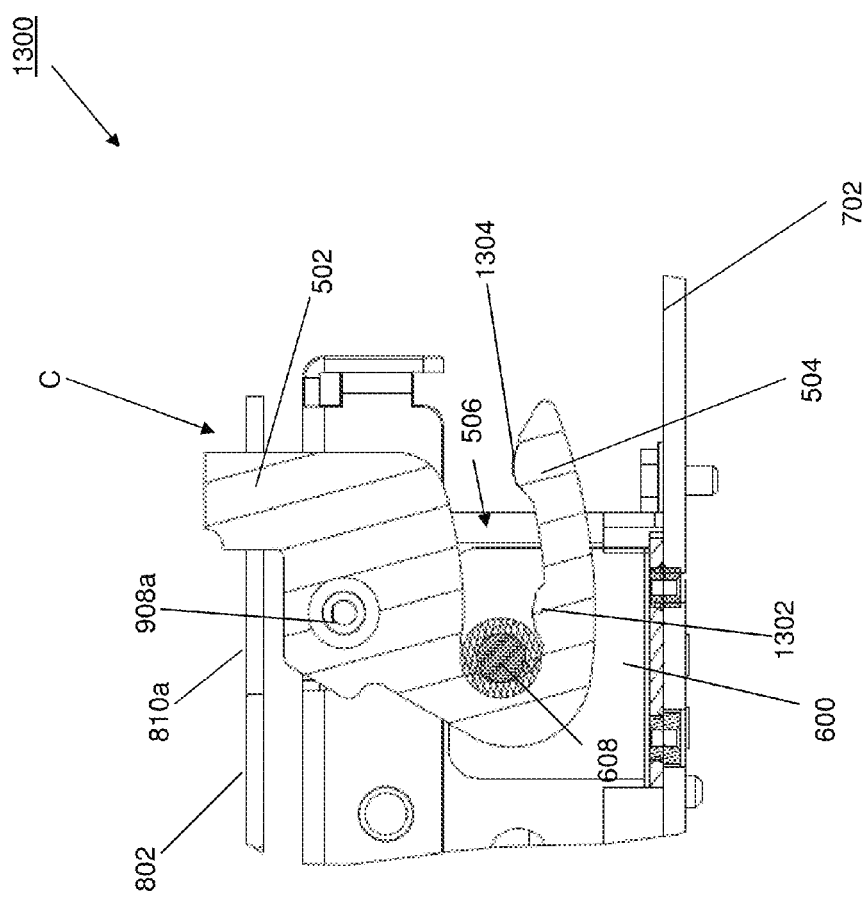
FIG. 13 is a side view illustrating an embodiment of a cam element with a plurality of detents.

Referring now to FIG. 13, an embodiment of a cam element 1300 is illustrated. The cam element 1300 is substantially similar to the cam element 500 discussed above with reference to FIG. 5, with the provision of a plurality of detents 1302 and 1304 that are located on the cam feature 504 and extend into the cam channel 506. One of skill in the art will recognize that the detent 1302 operates as a latch to keep the cam element 1300 in the position C unless a sufficient force is provided on the handle 200 to overcome the force provided by the engagement of the cam engagement member 608 and the detent 1302. Similarly, the detent 1304 operates with the cam element 1300 in the position B and engages the cam engagement member 608 to prevent the handle 200 from rotating in the direction A unless a sufficient force is provided on the handle 200 to overcome the force provided by the engagement of the cam engagement member 608 and the detent 1304.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A cam system, comprising:
   a beam including a plurality of coupling features;
   a handle extending from the beam;
   a plurality of cam elements that are each positionable and securable to the beam at different locations along the beam using a coupling member that engages a cam element of the plurality of cam elements and any of the plurality of coupling features; and
   a plurality of cam brackets that are each configured to be mounted to a first member having a first connector, wherein each of the plurality of cam elements is coupled to the beam using the coupling member that engages that cam element and a respective one of the plurality of coupling features such that the plurality of cam elements are positioned at different relative locations on the beam based on relative positions of the plurality of cam brackets mounted to the first member;
   wherein the coupled-together beam and the plurality of cam elements are configured to be coupled to a second member having a second connector such that, with the plurality of cam brackets mounted to the first member, engagement of the plurality of cam elements with the plurality of cam brackets mates the first connector and the second connector.

2. The system of claim 1, wherein the handle is a first handle that is configured to be coupled to the beam using a coupling member that engages the handle and any of the plurality of coupling features such that the first handle extends from the beam.

3. The system of claim 2, wherein the first handle includes a plurality of legs coupled together by an adjustable portion that is configured to vary the distance between the plurality of legs.

4. The system of claim 2, further comprising:
   a second handle that is configured to be coupled to the beam using a coupling member that engages the handle and any of the plurality of coupling features such that the second handle extends from the beam, wherein the coupled-together beam and plurality of cam elements are configured to be coupled a third member having a third connector such that, with the plurality of cam brackets mounted to the first member, the engagement of the plurality of cam elements with the plurality of cam brackets mates the first connector and the third connector.

5. The system of claim 1, wherein each of the plurality of cam elements includes a pivotable coupling that is configured to pivotably couple that cam element to the second member.

6. The system of claim 5, wherein the second member includes a plurality of pivotable couplers that are each configured to pivotally couple the pivotable coupling on a respective one of the plurality of cam elements to the second member.

7. The system of claim 1, wherein at least one of the plurality of cam elements includes a detent feature.

8. The system of claim 1, wherein the first member and the second member are circuit boards.

9. An information handling system (IHS), comprising:
a chassis;
a board located in the chassis and including a processor and a first connector coupled to the processor;
a plurality of cam brackets mounted to the board;
a first component including a second connector; and
a cam system coupled to the first component and mating the first connector and the second connector, wherein the cam system includes:
a beam including a plurality of coupling features;
a handle that extends from the beam; and
a plurality of cam elements that are each positionable and securable to the beam at different locations along the beam using a coupling member that engages a cam element of the plurality of cam elements and any of the plurality of coupling features, wherein each of the plurality of cam elements have been coupled to the beam using the coupling member that engages that cam element and a respective one of the plurality of coupling features such that the plurality of cam elements are positioned at different relative locations on the beam based on relative positions of the plurality of cam brackets mounted to the board, and wherein each of the plurality of cam elements engage a respective one of the plurality of cam brackets to mate the first connector and the second connector.

10. The IHS of claim 9, wherein the handle is a first handle that is configured to be coupled to the beam using a coupling member that engages the handle and any of the plurality of coupling features such that the first handle extends from the beam.

11. The IHS of claim 10, wherein the first handle includes a plurality of legs coupled together by an adjustable portion that is configured to vary the distance between the plurality of legs.

12. The IHS of claim 10, further comprising:
a second handle that is configured to be coupled to the beam using a coupling member that engages the handle and any of the plurality of coupling features such that the second handle extends from the beam, wherein the coupled-together beam and plurality of cam elements are configured to be coupled a second component having a third connector such that, with the plurality of cam brackets mounted to the board, the engagement of the plurality of cam elements with the plurality of cam brackets mates the first connector and the third connector.

13. The IHS of claim 9, wherein each of the plurality of cam elements includes a pivotable coupling that pivotably couples that cam element to the first component.

14. The IHS of claim 13, wherein the first component includes a plurality of pivotable couplers that each pivotally couple the pivotable coupling on a respective one of the plurality of cam elements to the first component.

15. The IHS of claim 9, wherein at least one of the plurality of cam elements includes a detent feature.

16. The IHS of claim 9, wherein the first component is a board.

17. A method for mating connectors, comprising:
mounting a plurality of cam brackets on a first member having a first connector;
providing a cam system by coupling a plurality of cam elements that are each positionable and securable to any of a plurality of coupling features included on a beam using a coupling member that engages a cam element of the plurality of cam elements and a respective one of the plurality of coupling features such that the plurality of cam elements are positioned at different relative locations on the beam based on the relative positions of the plurality of cam brackets mounted to the first member;
coupling the cam system to a second member having a second connector; and
engaging the plurality of cam elements with the plurality of cam brackets to mate the first connector and the second connector.

18. The method of claim 17, further comprising:
coupling a handle to the beam using a coupling member that engages the handle and a respective one of the plurality of coupling features.

19. The method of claim 18, wherein the handle includes a plurality of legs coupled together by an adjustable portion, the method further comprising:
adjusting the adjustable portion to vary the distance between the plurality of legs.

20. The method of claim 18, wherein the handle is selected from a first handle and a second handle that has different dimensions that the first handle.

* * * * *